United States Patent
Firouzbakht et al.

(10) Patent No.: US 11,418,975 B2
(45) Date of Patent: Aug. 16, 2022

(54) BASE STATION ANTENNAS WITH SECTOR SPLITTING IN THE ELEVATION PLAN BASED ON FREQUENCY BAND

(71) Applicant: CommScope Technologies LLC, Hickory, NC (US)

(72) Inventors: Farid Firouzbakht, Dallas, TX (US); Martin L. Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/149,816

(22) Filed: Jan. 15, 2021

(65) Prior Publication Data

US 2022/0116790 A1   Apr. 14, 2022

Related U.S. Application Data

(60) Provisional application No. 63/091,348, filed on Oct. 14, 2020.

(51) Int. Cl.
*H01Q 1/24* (2006.01)
*H04W 16/28* (2009.01)
(Continued)

(52) U.S. Cl.
CPC ............ *H04W 16/28* (2013.01); *H01Q 1/246* (2013.01); *H01Q 5/307* (2015.01); *H04B 7/0617* (2013.01)

(58) Field of Classification Search
CPC ............ H01Q 1/24; H01Q 1/42; H01Q 1/246; H01Q 3/00; H01Q 3/26; H01Q 5/50; H01Q 51/307; H01Q 21/00; H01Q 21/26; H01Q 21/30; H01Q 25/002; H04B 1/16; H04B 1/38; H04B 1/0057; H04B 1/06; H04B 7/10; H04B 7/0408; H04B 7/0456; H04B 7/0617; H04L 5/00; H04L 5/001; H04L 5/0048; H04W 16/28; H04W 56/00; H04W 56/0055; H04W 74/00; H04W 74/08; H04W 886/08; H04W 88/12
USPC ........ 342/174, 361, 371, 373; 373/729, 836, 373/844, 853, 893; 375/219, 260, 267, 375/295, 316
See application file for complete search history.

(56) References Cited

U.S. PATENT DOCUMENTS 9,831,548 B2    11/2017  Timofeev et al.
2015/0084832 A1*  3/2015  Al ........................ H01Q 21/061
                                                            343/893

(Continued)

*Primary Examiner* — Shawkat M Ali
(74) *Attorney, Agent, or Firm* — Myers Bigel, P.A.

(57) ABSTRACT

Base station antennas are provided that include a first array of radiating elements that is configured to form a first antenna beam that has a first downtilt angle in response to a first RF signal that is input at the first RF port and a second array of radiating elements that is configured to form a second antenna beam that has a second downtilt angle in response to a second RF signal that is input at the second RF port. The second downtilt angle is less than the first downtilt angle. The first antenna beam is configured to only provide coverage to users within a first portion of a coverage area of the base station antenna that is close to the base station antenna and the second antenna beam is configured to provide coverage to users within a second portion of the coverage area that extends farther from the base station antenna than does the first portion.

20 Claims, 11 Drawing Sheets

(51) Int. Cl.
*H01Q 5/307* (2015.01)
*H04B 7/06* (2006.01)

(56) References Cited

U.S. PATENT DOCUMENTS

2019/0028159 A1\* 1/2019 Bisiules .................. H01Q 5/45
2021/0227396 A1\* 7/2021 Khalid ................ H04B 7/0691

\* cited by examiner

BASE STATION ANTENNAS WITH SECTOR SPLITTING IN THE ELEVATION PLAN BASED ON FREQUENCY BAND

CROSS-REFERENCE TO RELATED APPLICATION

The present application claims priority under 35 U.S.C. § 119 to U.S. Provisional Patent Application Ser. No. 63/091,348, filed Oct. 14, 2020, the entire content of which is incorporated herein by reference.

FIELD

The present invention relates to cellular communications systems and, more particularly, to base station antennas that provide coverage to a sector of a cell.

BACKGROUND

Cellular communications systems are well known in the art. In a typical cellular communications system, a geographic area is divided into a series of regions that are referred to as "cells," and each cell is served by a so-called "macrocell" base station. Typically, a macrocell base station will serve users who are within a distance of, for example, 1-20 kilometers from the base station, although macrocell base stations having smaller "footprints" are often used in urban areas to increase capacity. The base station may include baseband equipment, radios and antennas that are configured to provide two-way radio frequency ("RF") communications with fixed and mobile subscribers ("users") that are positioned throughout the cell. In many cases, the cell may be divided into a plurality of "sectors," and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical (or near vertical) columns when the antenna is mounted for use. Herein, "vertical" refers to a direction that is perpendicular relative to the horizontal plane defined by the horizon. Reference will also be made to (1) the azimuth plane, which is a horizontal plane that bisects the base station antenna and (2) to the elevation plane, which is a plane extending along the boresight pointing direction of the antenna that is perpendicular to the azimuth plane.

In order to increase capacity, new portions of the frequency spectrum are being made available for cellular service. For example, a 150 MHz shared license access band of frequencies between 3.55 GHz and 3.7 GHz that is referred to as the Citizens Broadband Radio Service ("CBRS") band has recently been auctioned for use for general-purpose communications. Herein, this frequency band will be referred to as the "CBRS-band." While the CBRS-band is expected to be used widely for in-building wireless communications systems and possibly for small cell applications in the outdoor networks, the maximum effective isotropic radiated power or "EIRP" for outdoor base stations operating in the CBRS band is limited to 47 dBm. This cap on EIRP effectively limits the range of the CBRS communications to distances that make CBRS generally unsuitable for macrocell applications.

Another frequency band that will be made available in the near future is the 3.7-3.98 GHz frequency band, which will be referred to herein as the "C-band." The EIRP limit for base stations operating in the C-band is 63 dBm, which is forty times larger than the EIRP limit for CBRS-band base stations. It is anticipated that cellular operators will widely deploy base stations that operate in the C-band for macrocell applications. This deployment will likely involve adding multi-column arrays of radiating elements that operate in the C-band to conventional macrocell base station antennas that operate in other cellular frequency bands to increase the capacity of the macrocell base stations.

Multi-input-multi-output or "MIMO" communications are another technique that may be used to increase capacity. When MIMO transmission techniques are used, a baseband data stream is sub-divided into sub-streams, and each sub-stream is coded and passed to a radio that generates a separate RF signal from each sub-stream. The "order" of a MIMO communications system refers to the number of sub-streams that are transmitted as separate RF signals. Thus, a 4×MIMO communications system includes four sub-streams. The RF signals generated from each sub-stream are output through respective ports of the radio and transmitted through multiple different antenna arrays (or sub-arrays) that are, for example, spatially separated from one another and/or at orthogonal polarizations to ensure that the transmission paths are relatively decorrelated from each other. As a result, the RF signals output from each port of the radio may be transmitted over channels having different characteristics due to the different polarizations and/or the spatial separation between the antenna arrays. The coding applied to the sub-streams is used at the receiver to recover the original data stream from the multiple received (and demodulated) signals carrying the various sub-streams. The use of MIMO transmission techniques may help overcome the negative effects of multipath fading, signal reflections and the like to provide enhanced transmission quality and capacity.

SUMMARY

Pursuant to embodiments of the present invention, a base station antenna is provided that is configured to provide service to users within a coverage area. The base station antenna includes first and second ports, a first array of radiating elements that is configured to form a first antenna beam that has a first downtilt angle in response to a first RF signal that is input at the first RF port, and a second array of radiating elements that is configured to form a second antenna beam that has a second downtilt angle in response to a second RF signal that is input at the second RF port. The second downtilt angle is less than the first downtilt angle. The first antenna beam is configured to only provide coverage to users within a first portion of the coverage area that is close to the base station antenna and the second antenna beam is configured to provide coverage to users within a second portion of the coverage area that extends farther from the base station antenna than does the first portion. The second antenna beam may be an electronically-scannable antenna beam that may be scanned to provide coverage throughout at least the remainder of the coverage area.

In some embodiments, the second antenna beam may provide coverage to users in less than all of the coverage area.

In some embodiments, the first portion of the coverage area may be a generally pie-shaped region that extends outwardly from the base station antenna, and the second portion of the coverage area comprises a section of an annular region surrounding the base station that extends outwardly from the first portion of the coverage area.

In some embodiments, the first array may be configured to operate in all or part of the 3.55-3.70 GHz CBRS frequency band and the second array may be configured to operate in all or part of the 3.70-3.98 GHz C-band frequency band.

In some embodiments, a half power beamwidth of the second antenna beam in an elevation plane of the base station antenna may be less than a half power beamwidth of the first antenna beam in the elevation plane.

In some embodiments, the first RF port may be a first CBRS-band port, the second RF port may be a first C-band RF port, the first array may be a first CBRS-band array, the second array may be a first C-band array, the first antenna beam may be a first CBRS antenna beam, the second antenna beam may be a first C-band antenna beam, and the radiating elements of the first array and the second array may each be dual-polarized radiating elements. The base station antenna may further include a second CBRS-band RF port and a second C-band RF port. In such embodiments, first radiators of the dual-polarized radiating elements of the first CBRS-band array may be configured to generate the first CBRS-band antenna beam and second radiators of the dual-polarized radiating elements of the first CBRS-band array may be configured to generate a second CBRS-band antenna beam that is sized to only provide coverage to users within the first portion of the coverage area that is close to the base station antenna. Similarly, first radiators of the dual-polarized radiating elements of the first C-band array may be configured to generate the first C-band antenna beam and second radiators of the dual-polarized radiating elements of the first C-band array may be configured to generate a second C-band antenna beam that is sized to provide coverage to users within the second portion of the coverage area.

The base station antenna may further include third and fourth CBRS-band RF ports and third through eighth C-band RF ports, along with a second CBRS-band array of dual-polarized radiating elements that is configured to form third and fourth CBRS antenna beams and second through fourth C-band arrays of dual-polarized radiating elements. The second C-band array may be configured as to form third and fourth C-band antenna beams, the third C-band array may be configured as to form fifth and sixth C-band antenna beams, and the fourth C-band array may be configured as to form seventh and eighth C-band antenna beams.

In some embodiments, the first through fourth C-band arrays may be configured to operate as beamforming arrays so that the first, third, fifth and seventh C-band antenna beams constructively combine to form a first composite C-band antenna beam that has a narrowed azimuth beamwidth as compared to the first C-band antenna beam, and the second, fourth, sixth and eighth C-band antenna beams constructively combine to form a second composite C-band antenna beam that has a narrowed azimuth beamwidth as compared to the second C-band antenna beam.

In some embodiments, the first and second CBRS arrays may be respective first and second columns of radiating elements that are spaced apart by at least 0.9 of a first wavelength, where the first wavelength is the wavelength corresponding to a center frequency of an operating frequency band of the first and second CBRS arrays, and the first through fourth C-band arrays may be respective first through fourth columns of radiating elements that are spaced apart by less than 0.6 of a second wavelength, where the second wavelength is the wavelength corresponding to a center frequency of an operating frequency band of the first through fourth C-band arrays.

In some embodiments, a feed network for the first array may not include any adjustable phase shifters and a feed network for the second array includes a plurality of adjustable phase shifters.

Pursuant to further embodiments of the present invention, base station antennas are provided that are configured to provide service to users within a coverage area. These base station antennas include a first frequency band RF port, a second frequency band RF port, a first plurality of diplexers, a first linear array that includes a plurality of sub-arrays of radiating elements, where each diplexer in the first plurality of diplexers is coupled to a respective one of the sub-arrays, a first feed network that connects the first frequency band RF port to each of the diplexers, the first feed network including a first power divider that has an input that is coupled to the first frequency band RF port and a plurality of outputs that are coupled to the respective diplexers, and a second feed network that connects the second frequency band RF port to each of the diplexers, the second feed network including a second power divider that has an input that is coupled to the second frequency band RF port and a plurality of outputs that are coupled to the respective diplexers. The base station antenna is configured to generate a first antenna beam that only provides coverage to users within a first portion of the coverage area that is close to the base station antenna in response to a first RF signal input at the first frequency band RF port and to generate a second antenna beam that is configured to provide coverage to users within a second portion of the coverage area that extends farther from the base station antenna than does the first portion in response to a second RF signal input at the second frequency band RF port.

In some embodiments, a plurality of RF transmission paths connecting the first power divider to the respective diplexers may be configured to impart a fixed phase taper to the sub-components of the first RF signal that electronically downtilts the first antenna beam by a first amount.

In some embodiments, the second feed network may include an adjustable phase shifter that is coupled between the second power divider and the diplexers that is configured to impart an adjustable phase taper to the sub-components of the second RF signal input that electronically downtilts the second antenna beam by a second adjustable amount.

In some embodiments, a maximum value for the second adjustable amount may be less than the first amount.

In some embodiments, the first feed network may not include an adjustable phase shifter.

In some embodiments, the second antenna beam may provide coverage to users in less than all of the coverage area.

In some embodiments, the first frequency band RF port may be a first CBRS-band port, the second frequency band RF port may be a first C-band RF port, the first feed network may be a first CBRS-band feed network, the second feed network may be a first C-band feed network, the first power divider may be a first CBRS power divider, the second power divider may be a first C-band power divider, the first antenna beam may be a first CBRS antenna beam, and the second antenna beam may be a first C-band antenna beam.

In some embodiments, the second antenna beam may have a narrower half power beamwidth than the first antenna beam in the elevation plane.

In some embodiments, the base station antennas may further include a second CBRS-band RF port, a second C-band RF port, a second plurality of diplexers, a second linear array that includes a plurality of sub-arrays of radiating elements, where each diplexer in the second plurality of diplexers is coupled to a respective one of the sub-arrays of radiating elements of the second linear array, a second CBRS-band feed network that connects the second CBRS-band RF port to each of the diplexers in the second plurality of diplexers, the second CBRS-band feed network including a second CBRS power divider that has an input that is coupled to the second CBRS-band RF port and a plurality of outputs that are coupled to the respective diplexers in the second plurality of diplexers, and a second C-band feed network that connects the second C-band RF port to each of the diplexers in the second plurality of diplexers, the second C-band feed network including a second C-band power divider that has an input that is coupled to the second C-band RF port and a plurality of outputs that are coupled to the respective diplexers in the second plurality of diplexers. The second CBRS-band feed network may be configured to generate a second CBRS antenna beam that only provides coverage to users within the first portion of the coverage area and the second C-band feed network may be configured to generate a second C-band antenna beam that is configured to provide coverage to users within the second portion of the coverage area.

In some embodiments, the base station antennas may further include a third C-band RF port that is coupled to a third linear array that includes a plurality of sub-arrays of radiating elements and a fourth C-band RF port that is coupled to a fourth linear array that includes a plurality of sub-arrays of radiating elements. The third and fourth linear arrays may not be coupled to any CBRS-band RF ports.

In some embodiments, the first through fourth linear arrays may be configured to operate as a multi-column C-band beamforming antenna array.

In some embodiments, the first through fourth linear arrays may be spaced apart from adjacent ones of the first through fourth linear arrays by less than 0.6 of a second wavelength, where the second wavelength is the wavelength corresponding to a center frequency of an operating frequency band of the multi-column C-band beamforming array.

In some embodiments, the second linear array and the third linear array may each be in between the first linear array and the fourth linear array.

Pursuant to further embodiments of the present invention, base station antennas are provided that include first and second RF ports, a first linear array of radiating elements having a plurality of sub-arrays, the first linear array extending parallel to a longitudinal axis of the base station antenna, and a feed network that couples the first and second RF ports to the first linear array. The feed network includes a beamforming network that has a first input that is coupled to the first RF port, a second input that is coupled to the second RF port and a plurality of outputs; and a plurality of RF transmission paths that connect each output of the beamforming network to a respective one of the sub-arrays. The feed network is configured to impart a phase taper to sub-components of first and second RF signals that are input at the respective first and second RF ports in order to electronically downtilt first and second antenna beams that are generated by the base station antenna in response to the first and second RF signals.

In some embodiments, the first antenna beam may be configured to only provide coverage to users within a first portion of a coverage area that is close to the base station antenna and the second antenna beam may be configured to provide coverage to users within a second portion of the coverage area that extends farther from the base station antenna than does the first portion.

In some embodiments, the second antenna beam may provide coverage to users in less than all of the coverage area.

In some embodiments, the first portion of the coverage area may be a generally pie-shaped region having a point that extends outwardly from the base station antenna, and the second portion of the coverage area comprises a section of an annular region surrounding the base station that extends outwardly from the first portion of the coverage area.

In some embodiments, the base station antennas may further include an adjustable phase shifter disposed along each of the RF transmission paths.

In some embodiments, the first antenna beam and the second antenna beam may split a sector covered by the base station antenna in an elevation plane of the base station antenna.

In some embodiments, the first and second antenna beams may have the same boresight pointing direction in the azimuth plane.

In some embodiments, a half power beamwidth of the second antenna beam in an elevation plane of the base station antenna may be less than a half power beamwidth of the first antenna beam in the elevation plane.

Pursuant to still further embodiments of the present invention, methods of operating a base station antenna that has a predefined coverage area are provided. Pursuant to these methods, a first antenna beam is formed in response to a first radio frequency ("RF") signal that provides coverage only to users within a first portion of the coverage area that is close to the base station antenna. A second antenna beam is formed in response to a second RF signal that provides coverage to users within a second portion of the coverage area that extends outwardly beyond the first portion.

In some embodiments, the first antenna beam may comprise a CBRS-band antenna beam and the second antenna beam may comprise a C-band antenna beam.

In some embodiments, the second antenna beam may provide coverage to users in less than all of the coverage area.

In some embodiments, a half power beamwidth of the second antenna beam in an elevation plane of the base station antenna may be less than a half power beamwidth of the first antenna beam in the elevation plane.

In some embodiments, forming the second antenna beam may comprise forming a plurality of antenna beams that constructively combine to form a composite antenna beam having a narrowed azimuth beamwidth.

Pursuant to still further embodiments of the present invention, base station antenna are provided that include a multi-column array having a plurality of columns of radiating elements. The multi-column array is configured to operate as a static sector antenna in a first frequency band and to operate as a beamforming antenna in a second frequency band. All of the columns in the multi-column array operate in the second frequency band while less than all of the columns in the multi-column array operate in the first frequency band.

In some embodiments, the columns in the multi-column array that operate in the first frequency band may be non-adjacent columns. In some embodiments, the number of columns in the multi-column array that operate in the first frequency band may be half the number of columns. In some embodiments, the first frequency band is the 3.55-3.70 GHz CBRS frequency band and the second frequency band is the 3.70-3.98 GHz C-band frequency band.

In some embodiments, a first antenna beam generated by the multi-column array in response to an RF signal in the first frequency band is configured to only provide coverage to users within a first portion of the coverage area that is close to the base station antenna and a second antenna beam generated by the multi-column array in response to an RF signal in the second frequency band is configured to provide coverage to users within a second portion of the coverage area that is farther from the base station antenna than the first portion. The second antenna beam may provide coverage to users in less than all of the coverage area. The first portion of the coverage area may comprise a generally pie-shaped region having a point that extends outwardly from the base station antenna, and the second portion of the coverage area may comprise a section of an annular region surrounding the base station that extends outwardly from the first portion of the coverage area. An outer portion of the first portion of the coverage area may overlap an inner portion of the second portion of the coverage area.

DETAILED DESCRIPTION

Figure 1A:
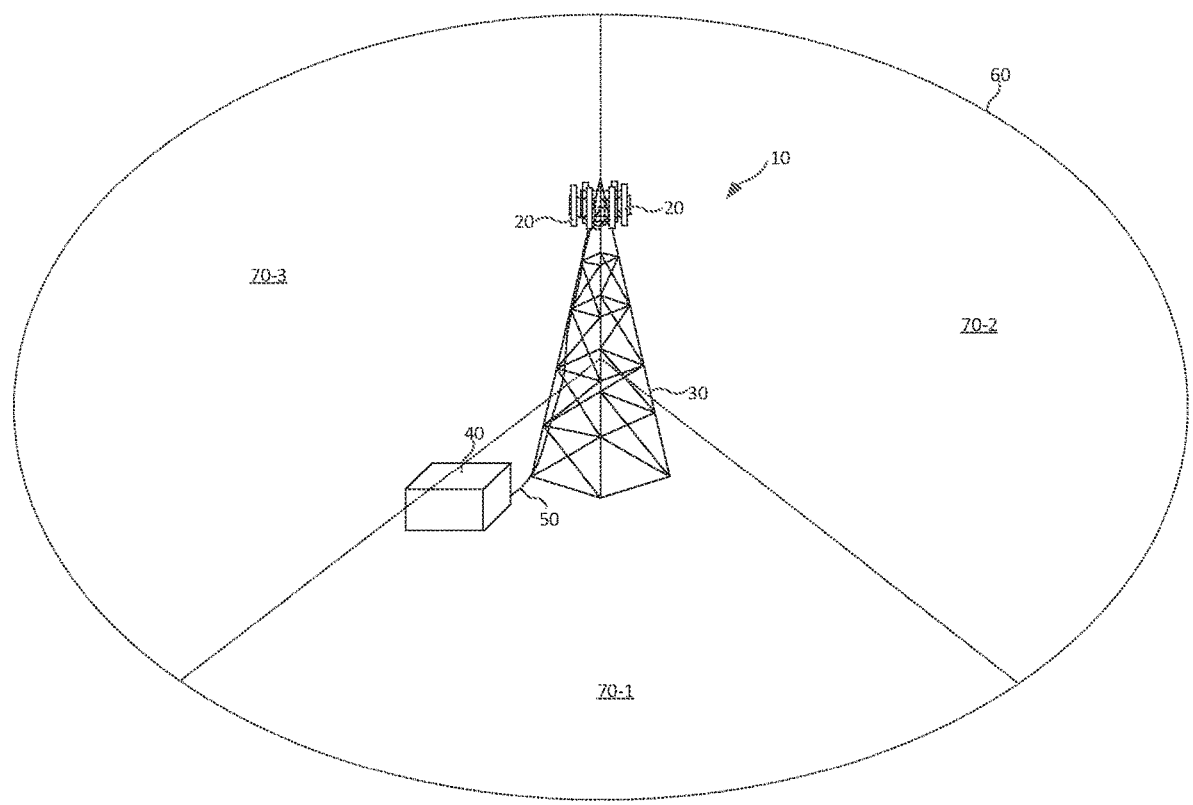
FIG. 1A is a schematic diagram illustrating a conventional macrocell base station.

Pursuant to embodiments of the present invention, macrocell sector base station antennas are provided that support both CBRS-band and C-band service. These base station antennas may be designed so that the CBRS-band antenna beams provide coverage to a first portion of the sector that is close to the base station, while the C-band antenna beams provide coverage to a second portion of the sector that extends farther from the base station antenna than does the first portion. Since the CBRS-band antenna beams are only used to provide service to users that are close to the base station antenna, the low EIRP limit that applies to CBRS communications may not be an issue, since the free space loss is much smaller given the reduced distance between the users and the base station. Since the C-band antenna beams need not provide coverage to close-in users, the C-band antenna beams may be designed to have narrower beamwidths in the elevation plane, and hence can provide higher antenna gain, which may allow for increased throughput and/or compensate for the larger free space loss associated with users that are further from the base station. Thus, the base station antennas according to embodiments of the present invention may efficiently use the spectrum available to network providers to provide increased throughput.

In some embodiments, the base station antennas may include both linear arrays of CBRS-band radiating elements and separate linear arrays of C-band radiating elements. In an example embodiment, first and second vertically-extending linear arrays of dual-polarized CBRS-band radiating elements may be provided, where the two CBRS-band linear arrays are separated from each other by at least a half of a wavelength at the center frequency of the CBRS frequency band, and more preferably by at least about a wavelength. Since each CBRS-band linear array is formed using dual-polarized radiating elements, each array can simultaneously generate a pair of antenna beams. Thus, the four CBRS antenna beams generated by the two CBRS-band linear arrays may be used to support 4×MIMO communications in the CBRS-band. Four vertically-extending C-band linear arrays may be provided that are also formed using dual-polarized radiating elements. The four C-band linear arrays may be arranged as four columns of radiating elements that are separated from each other by less than a wavelength and, more preferably, by about one half of a wavelength, at the center frequency of the C-band frequency band. The four C-band linear arrays may be coupled to a beamforming radio that can generate two antenna beams (one for each polarization) that have narrowed beamwidths in the azimuth plane (and hence higher gain). Thus, the C-band linear arrays may be used as a multi-column beamforming array and the antenna beams formed at the two different polarizations may support 2×MIMO communications. The C-band antenna beam may be electronically scanned in the azimuth plane so that it can provide coverage to any users in the outer portion of the sector.

The antenna beams generated by the CBRS linear arrays may be configured to have a relatively large downtilt so that the main lobe of these antenna beams intersect the ground relatively close to the base station. This may ensure that the CBRS antenna beams provide coverage to users within the sector served by the base station antenna who are in relative close proximity to the base station, but also means that the CBRS linear arrays cannot effectively serve users who are farther from the base station. The antenna beams generated by the multi-column C-band beamforming array may be configured to have less downtilt than the CBRS antenna beams so that the main lobes of the C-band antenna beams intersect the ground nearer to the outer edge of the sector. The C-band linear arrays may also have a larger number of radiating elements per column as compared to the CBRS array, and thus may have narrower beamwidths in the elevation plane and may exhibit higher antenna gain. The combination of the reduced downtilt and higher gain ensures that the C-band antenna beams provide good coverage to the outer portion of the sector that is not served by the CBRS linear arrays. The C-band antenna beams may be designed to cover the entire outer portion of the sector, or may have a narrowed azimuth beamwidth so that the C-band antenna beam only covers a section of the outer portion of the sector. In such embodiments, the C-band antenna beam can be electronically scanned so that the C-band antenna beam can provide coverage to the entire outer portion of the coverage area.

In other embodiments, the base station antenna may include at least some linear arrays of wideband, dual-polarized radiating elements that support both CBRS and C-band communications. Ports of a CBRS-band radio are coupled to a CBRS-band feed network and ports of a C-band radio are coupled to a C-band feed network. Diplexers are coupled between the feed networks and the radiating elements of the linear arrays that allow RF signals from both feed networks to be transmitted through the same, shared radiating elements. The C-band feed network may include adjustable phase shifters that allow the downtilt of the antenna beams to be adjusted to, for example, change the size of the coverage area. The CBRS-band feed network may include a fixed downtilt and/or adjustable phase shifters.

In still other embodiments, base station antennas are provided that include beamforming networks that perform sector splitting in the elevation plane. As is known in the art, a beamforming network such as a Butler Matrix may be used to transmit multiple RF signals through a multi-column array of radiating elements. The beamforming network forms, for example, first and second antenna beams that are pointed in different directions in response to first and second RF signals. Base station antennas that include such beamforming networks are often referred to as "twin beam" antennas. Twin beam antennas have been routinely used to split a 120° sector in the azimuth plane into two 60° sectors that operate in the same frequency band.

The sector splitting base station antennas according to embodiments of the present invention take a different approach, and instead are used to split a sector in the elevation plane. In particular, these antenna use beamforming networks to generate one or more first antenna beams that have a first boresight pointing direction in the elevation plane and one or more second antenna beams that have a second (different) boresight pointing direction in the elevation plane. The first antenna beams may be, for example, CBRS-band antenna beams, and may have lower (i.e., more downtilted) elevation angles than the second antenna beams, which may be C-band antenna beams. The CBRS-band antenna beams may be configured to provide coverage to a close-in region of the sector and the C-band antenna beams may be configured to provide coverage to a far-out region of the sector.

Base station antenna are also provided that include a multi-column array having a plurality of columns of radiating elements. The multi-column array is configured to operate as a static sector antenna in a first frequency band and to operate as a beamforming antenna in a second frequency band. All of the columns in the multi-column array operate in the second frequency band while less than all of the columns in the multi-column array operate in the first frequency band.

While the present disclosure primarily focuses on sector splitting in the CBRS-band and C-band, it will be appreciated that embodiments of the present invention are not limited thereto. For example, in the United States, the Federal Communications Commission has proposed the 3.1-3.55 GHz band for cellular service. The 3.45-3.55 GHz sub-band, if used for cellular communications, would likely be treated in a manner similar to C-band, and this band may or may not ultimately be considered to be part of the "C-band." The 3.1-3.3 GHz and 3.3-3.45 GHz bands may be handled separately, and it is not clear whether they might be treated as extensions to C-band, CBRS-band, or potentially some combination. In any event, the techniques disclosed herein could be implemented in various of these bands, particularly if the bands have significantly different EIRP limitations. Other frequency bands could also be used.

Embodiments of the present invention will now be discussed in further detail with reference to the attached drawings.

FIG. 1A is a schematic diagram illustrating a conventional macrocell base station 10. As shown in FIG. 1A, the macrocell base station 10 includes a plurality of base station antennas 20 that are typically mounted on a raised structure such as an antenna tower 30. The base station 10 further includes base station equipment such as baseband units, power supplies, a power bus, batteries, Antenna Interface Signal Group ("AISG") controllers and the like (not visible in the figure) that are typically stored in an enclosure 40 located at the bottom of the antenna tower 30. Radios (not visible in the figure) may either be co-located with the baseband equipment in the equipment enclosure 40, or may be mounted on the antenna tower 30 adjacent the antennas 20. Cables 50 may extend from the equipment enclosure to the top of the antenna tower 30 to provide DC power, RF signals and/or baseband data to the base station antennas 20 and any tower mounted radios.

As is further shown in FIG. 1A, the macrocell base station 10 provides coverage to a cell 60 of a cellular network. The macrocell base station 10 is a so-called "three-sector" base station in which the cell is divided into three sectors 70-1, 70-2, 70-3 in the azimuth plane. Each sector 70 extends through an arc of about 120° in the azimuth plane so that together the three sectors provide omnidirectional (i.e., 360°) coverage in the azimuth plane. In the depicted embodiment, two base station antennas 20 are provided for each sector. The two base station antennas 20 may, for example, operate in different frequency bands, or may be operated by different cellular providers who lease space on the same antenna tower 30.

Each base station antenna 20 may include one or more arrays of radiating elements (e.g., patch or crossed dipole radiating elements) that are used to transmit RF signals to users located within the sector covered by the base station antenna 20, and to receive RF signals from such users. Each array of radiating elements concentrates the RF energy that is transmitted in, or received from, certain directions. The "gain" of an array in a given direction is a measure of the ability of the array to concentrate the RF energy in that direction. The "radiation pattern" of an array—which is also referred to as an "antenna beam"—is a compilation of the gain of the array across all different directions. In a three-sector configuration, the antenna beams generated by each base station antenna typically have a Half Power Beamwidth ("HPBW") in the azimuth plane of about 65° so that the antenna beams provide good coverage throughout their assigned 120° sector. Each antenna beam may be designed to have minimum gain levels throughout the pre-defined coverage area, and to have much lower gain levels outside of the coverage area to reduce interference between neighboring cells/sectors. Typically, the arrays of radiating elements comprise vertically-extending columns of radiating elements. By providing a column of radiating elements extending along the elevation (vertical) plane, the elevation HPBW of the antenna beam may be narrowed to be significantly less than 65°, thereby increasing the gain of the antenna beam within the coverage area. In some cases, the radiating elements in a vertically-extending linear array may be laterally offset from at least some of the other radiating elements to a small degree in order to narrow the azimuth beamwidth of the antenna beam(s) generated by the linear array. It will be appreciated that columns of radiating elements that include such small lateral offsets comprise "linear arrays" as that term is used in the present application.

The size of the coverage area for a base station antenna 20 (or an array of radiating elements thereof) is a function, among other things, of the boresight pointing direction of the antenna beam in the vertical or "elevation" plane, where the "boresight pointing direction" refers to the direction in which the antenna beam exhibits peak gain. The boresight pointing direction in the elevation plane is typically described in terms of the angle between a horizontal plane that bisects the base station antenna 20 and the vector extending from the base station antenna 20 corresponding to the maximum gain of the antenna beam. This angle is referred to as the "tilt" angle or the "downtilt" angle (since the pointing direction of the antenna beam is almost always below the above-referenced horizontal plane).

While the boresight pointing direction of an antenna beam can be adjusted by physically adjusting the tilt angle of the antenna itself (i.e., mounting the base station antenna so that it is tilted downwardly), most modern base station antennas are designed so that a cellular operator can electronically change the tilt angle of an antenna beam from a remote location. In particular, the tilt angle of an antenna beam may be electronically altered by transmitting control signals to the antenna that cause the antenna to apply a phase progression (which may also be referred to herein as a phase taper) to the sub-components of the RF signals that are transmitted and received by the individual radiating elements of the array that generates the antenna beam. The greater this phase taper, the more the pointing direction of the antenna beam is electronically downtilted below the horizontal plane that bisects the base station antenna. Typically, the phase taper is applied by adjusting the settings on an electromechanical phase shifter that is positioned along the RF transmission path between a radio and the individual radiating elements of the array.

Figure 1B:
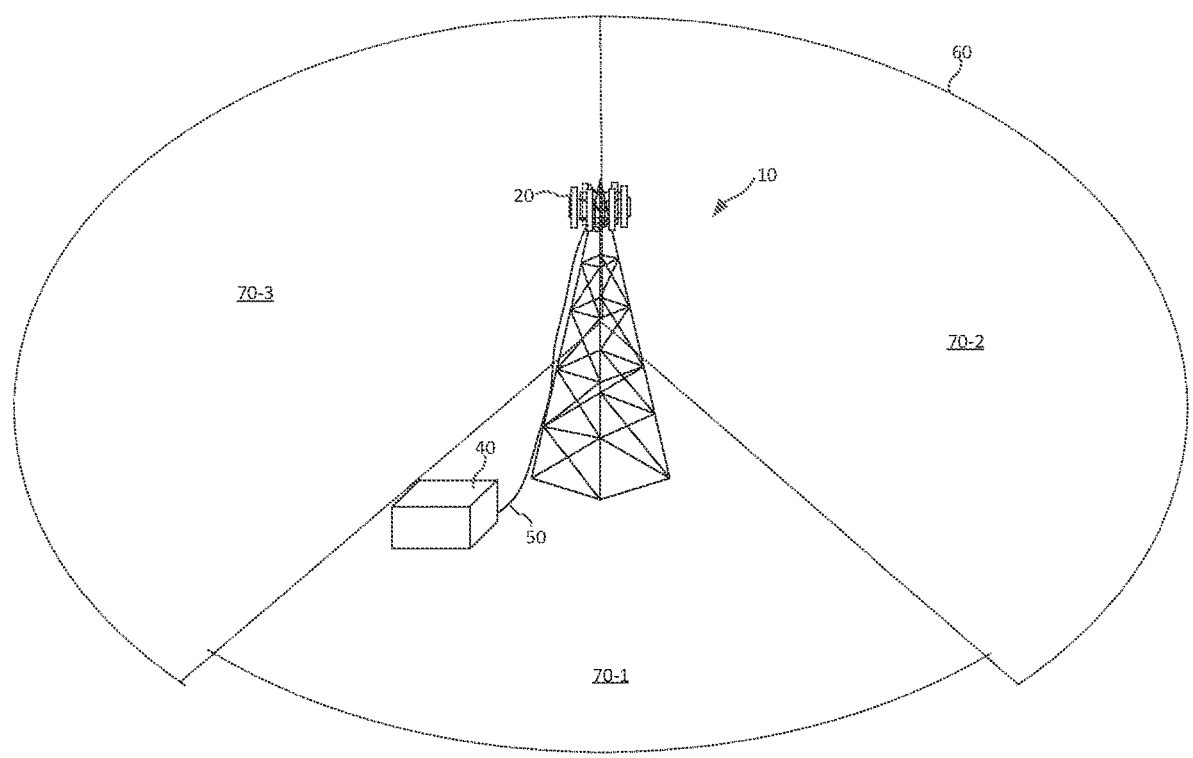
FIG. 1B is a schematic diagram illustrating how the coverage area for a sector of the conventional macrocell base station of FIG. 1A may be changed.

FIG. 1B schematically illustrates how the coverage area for a sector of the conventional macrocell base station 10 of FIG. 1A may be changed. As shown in FIG. 1B, by increasing the downtilt angle on an antenna beam generated by the base station antenna 20 providing coverage to sector 70-1, the size of the coverage area may be reduced. Network operators routinely adjust the sizes of the coverage areas for base stations as new base stations 10 are added to the network and/or the antennas 20 on existing base stations 10 are changed or upgraded in order to reduce interference between base stations 10 in the cellular network.

As discussed above, pursuant to embodiments of the present invention, the combination of a CBRS-band communication system and a C-band communication system may be used to provide coverage to a sector 70 of a macrocell base station 10. This is accomplished by configuring the CBRS communication system to provide coverage to users in the sector 70 that are in close proximity to the base station 10, while using the C-band communication system to provide coverage to users in the sector 70 that are at greater distances from the base station 10. This concept is schematically shown in FIG. 2.

Figure 2:
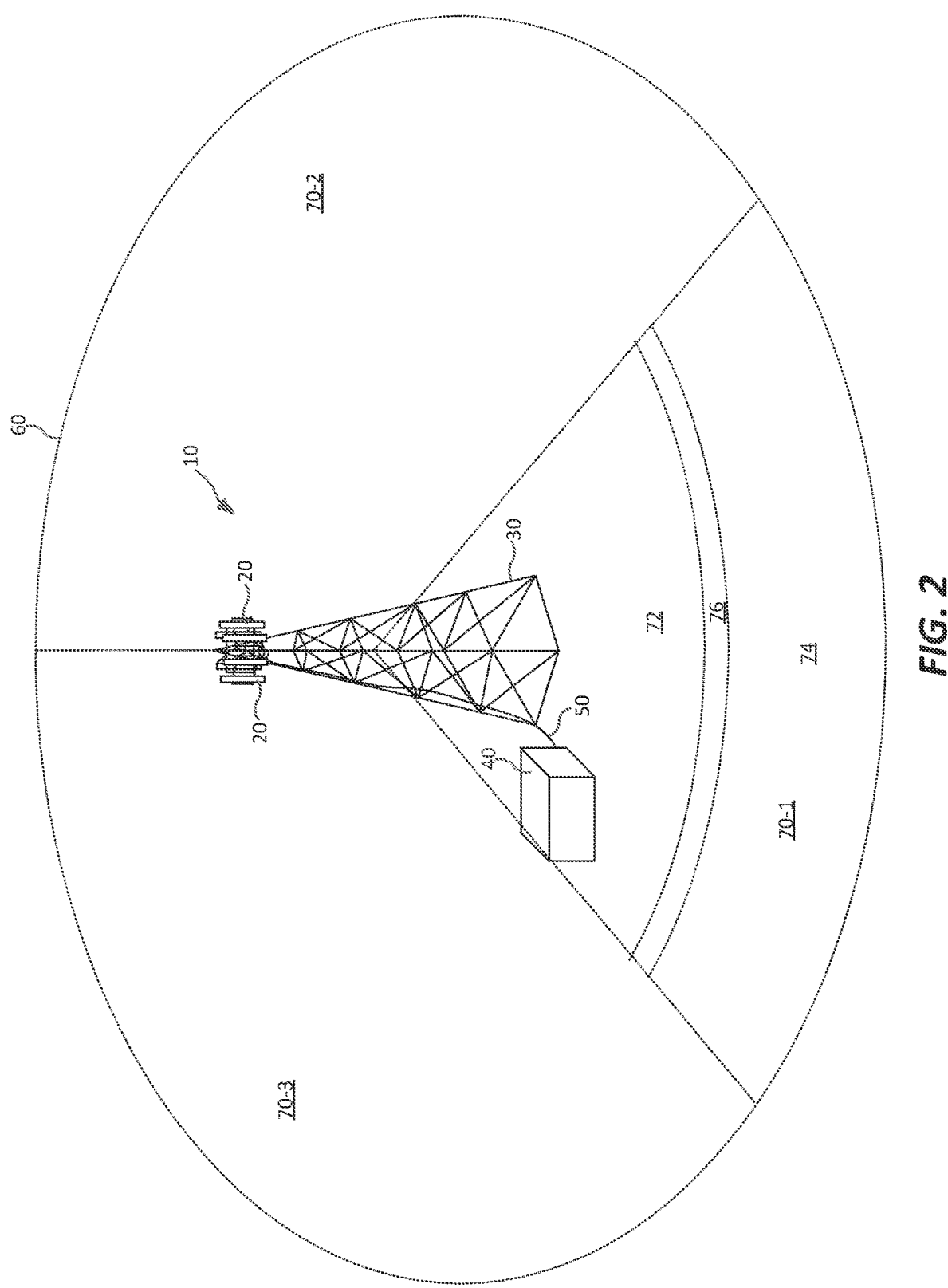
FIG. 2 is a schematic diagram illustrating a macrocell base station according to embodiments of the present invention.

As shown in FIG. 2, a base station antenna according to embodiments of the present invention may provide coverage to a sector 70-1 of a cell 60. The sector 70-1, however, is divided into two regions, namely a close-in region 72 that corresponds to the portion of the sector 70-1 that is within a certain distance of the base station 10 and a far-out region 74 that comprises the remainder of the sector 70-1. Users in the close-in portion 72 of the sector 70-1 may communicate with the base station antenna 20 in the CBRS-band, while users in the far-out region 74 may communicate with the base station antenna 20 in the C-band. The demarcation between the close-in region 72 and the far-out region 74 may vary based on a number of factors including, for example, the terrain, the interference environment, etc., and hence the demarcation will typically not be at a fixed distance as suggested in FIG. 2. Moreover, the demarcation between the close-in region 72 and the far-out region 74 may also vary based on the capabilities (e.g., antenna gain, transmit power, etc.) of the user devices, and hence it will be appreciated that a first user may communicate with the base station antenna 20 in the CBRS-band while a second user at the same location may communicate with the base station antenna 20 in the C-band because of the different capabilities of the user devices. As is also shown in FIG. 2, an overlap region 76 may exist where both the CBRS and C-band antenna beams provide sufficient gain to support users.

In order to provide coverage to the close-in region 72, the CBRS antenna beams may be at a relatively large downtilt, so that the center of the main lobe is pointed at the ground at a relatively short distance from the base station 10. In example embodiments, the CBRS antenna beams may have downtilts of 8°, 10°, 12° or even 14°. Since the CBRS communications have relatively low EIRP limits, the array(s) of radiating elements included in base station antenna 20 that operate in the CBRS-band need not have a particularly large number of radiating elements, as large antenna gain is not required to transmit at the maximum EIRP. Since the CBRS-band arrays may have relatively fewer radiating elements, they may be less expensive to deploy and may require less space on the reflector of the base station antenna. Since the users who communicate with the base station antenna 20 in the CBRS-band are all relatively close to the base station 10, the free space loss experienced by the CBRS transmissions (in both directions) may be relatively small, allowing for reliable communications.

In order to provide coverage to the far-out region 74, the C-band antenna beams will typically (but need not always) have less downtilt than the CBRS antenna beams. Moreover, since the array(s) of radiating elements included in base station antenna 20 that operate in the C-band need not provide coverage to the entire sector 70-1, the C-band antenna beams may be designed to have narrower elevation beamwidths so that the C-band antenna beams do not cover at least some of the close-in region 72. In order to achieve such narrower elevation beamwidths, the C-band arrays may have more radiating elements than the CBRS arrays, and may have more radiating elements than a comparable C-band array that is designed to cover the entire sector 70-1. The narrower elevation beamwidth also results in an increased gain, which may increase capacity at C-band. It will be appreciated, however, that in some embodiments the C-band array may generate antenna beams that provide coverage to the entire sector 70-1.

The CBRS-band arrays may each generate antenna beams that have a HPBW of approximately 65° in the azimuth plane so that each CBRS-band antenna beam provides coverage to the entirety of the close-in region 72 of the sector 70-1. In contrast, the C-band arrays may together generate an antenna beam (or a pair of antenna beams if dual-polarized radiating elements are used) that have a HPBW of significantly less than 65° in the azimuth plane so that each C-band antenna beam provides coverage to only a portion of the far-out region 74 of the sector 70-1. As a result, the C-band antenna beams may have higher gain. In such embodiments, the C-band antenna beams may be electronically scanned in the azimuth plane (e.g., on a time slot-by-time slot basis) in order to provide coverage throughout the entirety of the far-out region 74 of the sector 70-1.

In some embodiments of the present invention, base station antennas may be provided that include both arrays of radiating elements that are configured to operate in the CBRS-band as well as arrays of radiating elements that are configured to operate in the C-band. In other embodiments, base station antennas are provided that include shared arrays of radiating elements that are used for both CBRS-band and C-band communications. FIGS. 3A-3E illustrate several example base station antennas according to embodiments of the present invention that use separate CBRS-band and C-band linear arrays to split a sector in the elevation plane.

Figure 3A:
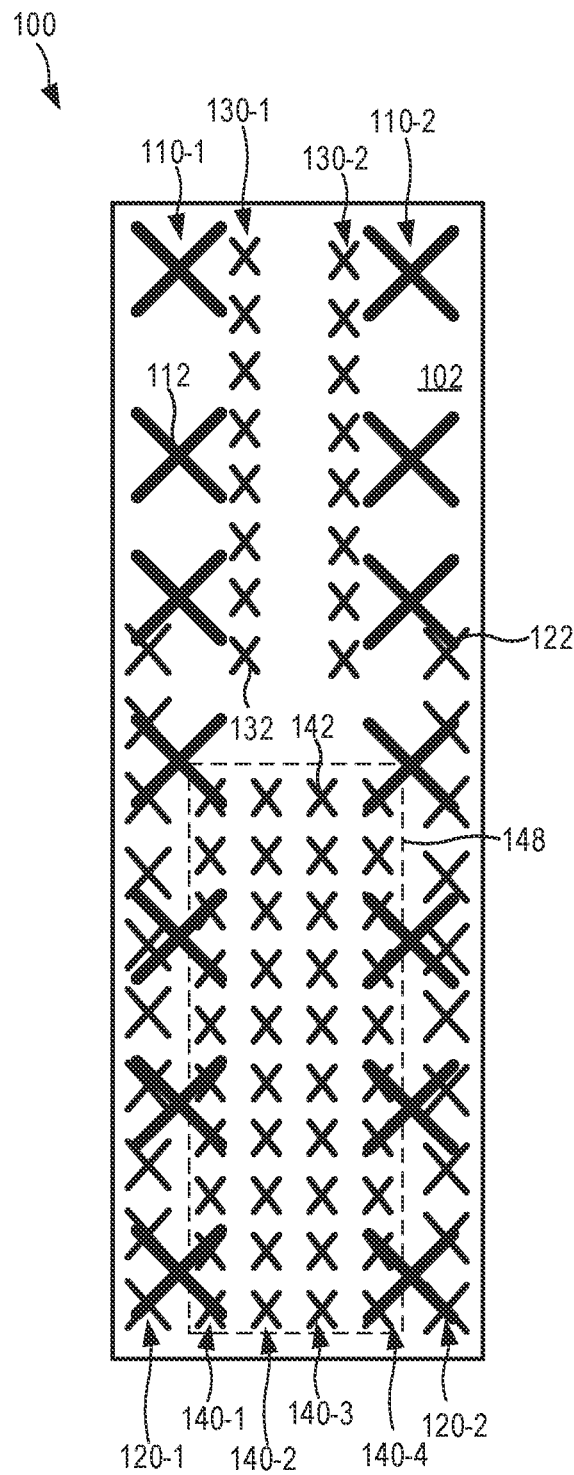
FIG. 3A is a schematic front view of a base station antenna (with the radome removed) according to embodiments of the present invention that includes separate CBRS-band and C-band arrays.
Figure 3E:
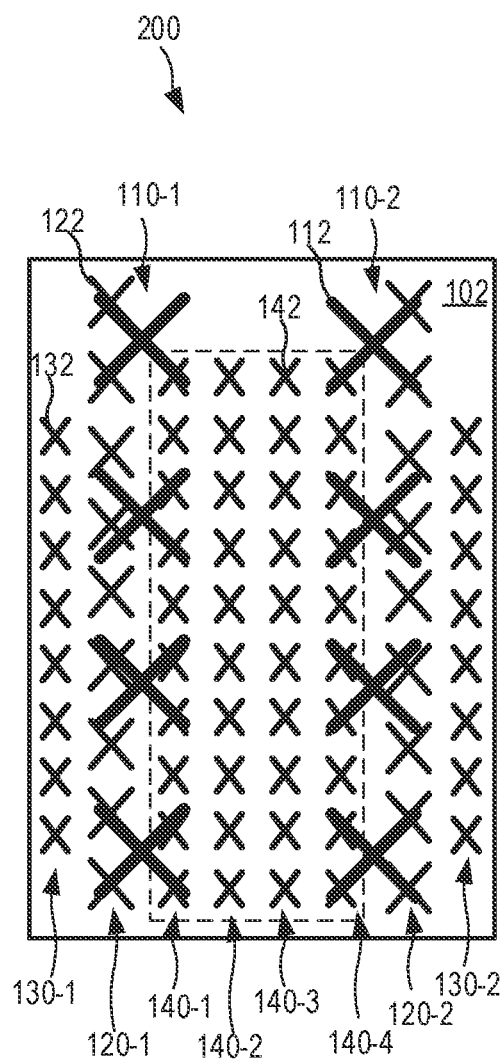
FIG. 3E is a schematic front view of another base station antenna according to embodiments of the present invention that includes separate CBRS-band and C-band arrays.
Figure 3B:
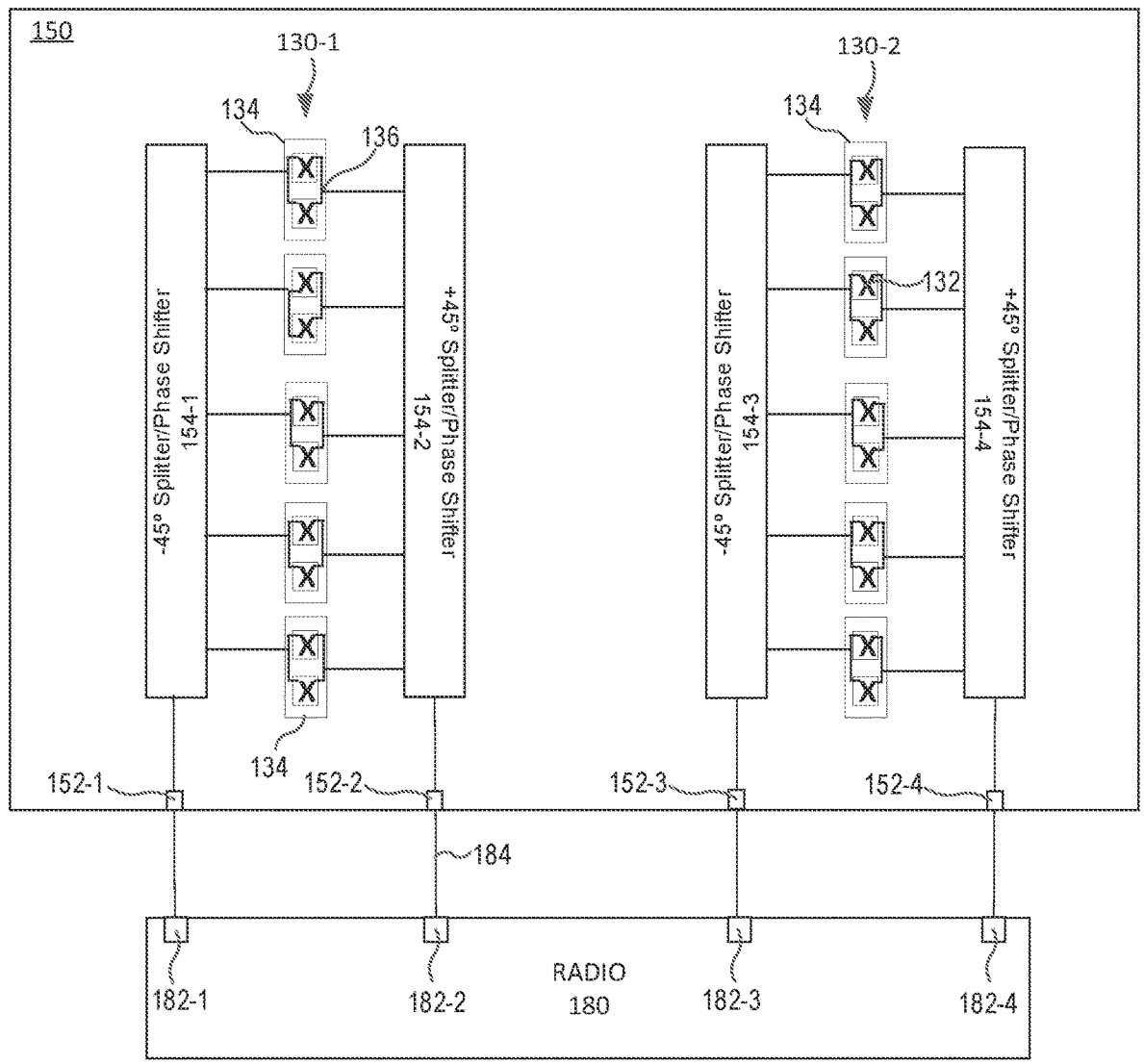
FIG. 3B is a block diagram of a feed network for the CBRS-band array of the base station antenna of FIG. 3A.
Figure 3C:
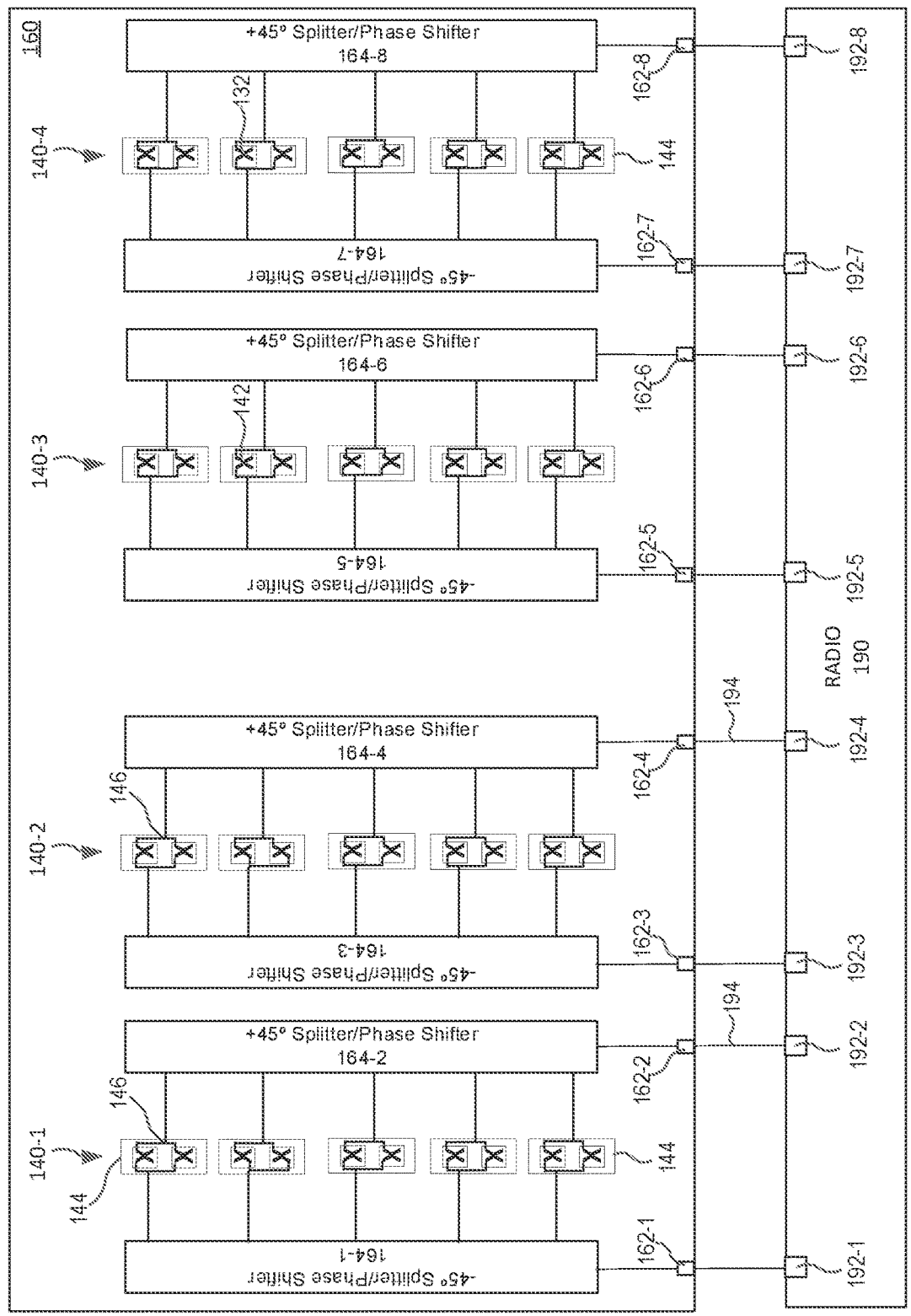
FIG. 3C is a block diagram of a feed network for the C-band array of the base station antenna of FIG. 3A.

FIGS. 3A-3C schematically illustrate a first base station antenna 100 according to embodiments of the present invention that uses separate CBRS-band and C-band arrays to perform sector splitting in the elevation plane so that the CBRS-band array provides coverage to users in a close-in region 72 of the sector and the C-band array provides coverage to users in a far-out region 74 of the sector 70-1. In particular, FIG. 3A is a schematic front view of the base station antenna 100 (with a radome removed), while FIGS. 3B and 3C are schematic block diagrams of the feed networks for the CBRS-band and C-band arrays of radiating elements, respectively.

As shown in FIG. 3A, the base station antenna 100 includes a reflector assembly 102. The reflector assembly 102 may comprise a backplane that may act as both a reflector and a ground plane for the radiating elements (described below) that are mounted thereon. The base station antenna 100 includes first and second linear arrays 110-1, 110-2 of low-band radiating elements 112 and first and second linear arrays 120-1, 120-2 of mid-band radiating elements 122 that are mounted to extend forwardly from the reflector assembly 102. It should be noted that herein, when multiple like or similar elements are provided, they may be labelled in the drawings using a two-part reference numeral. Such elements may be referred to herein individually by their full reference numeral (e.g., linear array 120-2) and may be referred to collectively by the first part of their reference numeral (e.g., the linear arrays 120). The low-band radiating elements 112 may be configured to operate in, for example, the 617-960 MHz frequency band or a portion thereof (e.g., the 696-960 MHz frequency band). The low-band linear arrays 110 extend vertically along the reflector 102 as a pair of adjacent columns. The mid-band radiating elements 122 may be configured to operate in, for example, the 1427-2690 MHz frequency band or a portion thereof (e.g., the 1695-2690 MHz frequency band). The mid-band linear arrays 120 extend vertically along the respective edges of the reflector 102 outside the respective low-band linear arrays 110.

The base station antenna 100 further includes two linear arrays 130-1, 130-2 of CBRS-band radiating elements 132 and four linear arrays 140-1 through 140-4 of C-band radiating elements 142. The CBRS-band and C-band radiating elements 132, 142 are each mounted to extend forwardly from the reflector assembly 102, and may be implemented using dual-polarized radiating elements such as cross-dipole radiating elements that include first and second radiators that radiate at respective first and second orthogonal polarizations. The CBRS-band radiating elements 132 may be configured to operate in, for example, the 3555-3700 MHz frequency band or a portion thereof. The C-band radiating elements 142 may be configured to operate in, for example, the 3700-4000 MHz frequency band or a portion thereof. In some embodiments, the CBRS-band and C-band radiating elements 132, 142 may be implemented using a common radiating element that operates across both the CBRS-band and C-band frequency bands. In other embodiments, separate radiating element designs may be used (which may allow for slightly smaller CBRS-band radiating elements 132).

The CBRS-band linear arrays 130-1, 130-2 extend vertically along the reflector 102 as a pair of adjacent columns that are mounted to extend forwardly from an upper center section of the reflector 102 in between the low-band linear arrays 110. The two CBRS arrays 130 may be positioned a CBRS wavelength or more apart, where a CBRS wavelength refers to the wavelength corresponding to the center frequency of the operating frequency band of the CBRS radiating elements 132 (i.e., 3625 MHz). In example embodiments, the first and second CBRS-band linear arrays 130-1, 130-2 comprise respective first and second columns of radiating elements that are spaced apart by at least 0.9 of a CBRS wavelength. Since dual-polarized radiating elements are used in the CBRS-band linear arrays 130, each CBRS-band linear array may simultaneously generate two separate antenna beams, and hence a total of four CBRS-band antenna beams may be simultaneously generated by the base station antenna 100. The CBRS-band linear arrays 130 may use the four CBRS-band antenna beams to support 4×MIMO communications.

The C-band linear arrays 140 extend vertically along the reflector 102 as four closely-located columns that are mounted to extend forwardly from a lower center section of the reflector 102 in between the low-band linear arrays 110. Each C-band linear array 140 may be positioned to be about a half a C-band wavelength from each adjacent C-band linear array 140, where a C-band wavelength refers to the wavelength corresponding to the center frequency of the operating frequency band of the C-band radiating elements 142 (i.e., 3850 MHz). In example embodiments, the first through fourth C-band linear arrays 140-1 through 140-4 comprise respective first through fourth columns of radiating elements that are spaced apart by less than 0.75 of a C-band wavelength and, more preferably, less than 0.6 of a C-band wavelength or less than 0.5 of a C-band wavelength. Such spacings allow the four C-band linear arrays 140 to operate as a multi-column beamforming array 148 that performs beamforming in the azimuth plane. For example, the four C-band linear arrays 140-1 through 140-4 may operate as a time division duplexing ("TDD") C-band beamforming array 148 that generates narrowed antenna beams in the azimuth plane on a time-slot by time-slot basis of the TDD frame and that uses the two polarizations to communicate using 2×MIMO techniques during each time slot. These antenna beams having narrowed azimuth beamwidths may be electronically scanned in the azimuth plane.

Each linear array 110, 120, 130, 140 may be oriented generally vertically with respect to the horizon when the base station antenna 100 is mounted for use. In the depicted embodiment, each linear array 110 includes a total of seven radiating elements 112, each linear array 120 includes a total of ten radiating elements 122, each linear array 130 includes a total of eight radiating elements 132, and each linear array 140 includes a total of ten radiating elements 142. It will be appreciated, however, that other numbers of radiating elements 112, 122, 132, 142 may be included in the linear arrays 110, 120, 130, 140. Any appropriate radiating elements 112, 122, 132, 142 may be used including, for example, dipole, cross-dipole and/or patch radiating elements. In some embodiments, each radiating element 112, 122, 132, 142 may include a pair of dipole radiators, where the radiators of each pair are arranged orthogonally to each other at angles −45° and the +45° with respect to the longitudinal (vertical) axis of the antenna 100. The base station antenna 100 may further include a radome (not shown) that covers and protects the radiating elements 112, 122, 132, 142 and other components of the base station antenna 100.

As shown in FIG. 3B, the feed network 150 for the CBRS-band linear arrays 130-1, 130-2 of base station antenna 100 includes four RF ports 152-1 through 152-4. Each RF port 152-1 through 152-4 may be connected to a respective port 182-1 through 182-4 of a CBRS radio 180 by, for example, a respective coaxial cable 184. Each CBRS RF port 152-1 through 152-4 is connected to a respective phase shifter 154-1 through 154-4. Each phase shifter 154 is configured to receive RF signals from its associated RF port 152, subdivide each RF signal into a plurality of sub-components, and impart a phase taper across the different sub-components of the RF signal. The phase shifted sub-components of the RF signal are then output to the corresponding first or second polarization radiators of the radiating elements 132 of the corresponding CBRS-band linear array 130. In this particular embodiment, each phase-shifted sub-component is passed to a respective feed board 134. The feed board 134 may comprise, for example, a printed circuit board that is mounted in front of the reflector assembly 102. One or more of the CBRS-band radiating elements 132 may be mounted to extend forwardly from each feed board 134. The feed boards 134 that include more than one radiating element 132 mounted thereon may include feed board power dividers 136 (one for each polarization) that further split the sub-components of the RF signal passed from the phase shifter 154 thereto, and the outputs of the power divider 136 are passed to respective CBRS-band radiating elements 132 where they are radiated into free space to generate the CBRS-band antenna beams. The phase taper that is applied across the sub-components of the RF signal that are passed to the respective feed boards 134 acts to shape the antenna beam formed by each CBRS-band linear array 130 so that it is electronically downtilted in the elevation plane, as is understood in the art. The phase shifters 154 may be adjustable electromechanical remote electronic downtilt ("RET") phase shifters so that the amount of downtilt applied to the antenna beam can be adjusted from a remote location by sending control signals to a controller (not shown) that adjusts the phase shifters 154 to apply a different amount of electronic downtilt to each CBRS-band antenna beam.

As shown in FIG. 3B, the first RF port 152-1 passes RF signals between a first port 182-1 of the CBRS radio 180 and the −45° polarization radiators of the radiating elements 132 in CBRS-band linear array 130-1, the second RF port 152-2 passes RF signals between a second port 182-2 of the CBRS radio 180 and the +45° polarization radiators of the radiating elements 132 in CBRS-band linear array 130-1, the third RF port 152-3 passes RF signals between a third port 182-3 of the CBRS radio 180 and the −45° polarization radiators of the radiating elements 132 in CBRS-band linear array 130-2, and the fourth RF port 152-4 passes RF signals between a fourth port 182-4 of the CBRS radio 180 and the +45° polarization radiators of the radiating elements 132 in CBRS-band linear array 130-2.

As shown in FIG. 3C, the C-band feed network 160 for base station antenna 100 includes eight RF ports 162-1 through 162-8. Each C-band RF port 162-1 through 162-8 may be connected to a respective port 192 of a C-band radio 190 by, for example, a respective coaxial cable 194. Each C-band RF port 162-1 through 162-8 is connected to a respective phase shifter 164-1 through 164-8. Each phase shifter 164 is configured to receive RF signals from its associated C-band RF port 162, subdivide each RF signal into a plurality of sub-components, and impart a phase taper across the different sub-components of the RF signal. The phase shifted sub-components of the RF signal are then output to the radiating elements 142 of the C-band linear array 140. In this particular embodiment, each phase-shifted sub-component is passed to a respective feed board 144, which further splits the sub-component of the RF signal using a power divider 146, and the further sub-divided components of the RF signal that output from each power divider 146 are passed to respective radiating elements 142 where they are radiated into free space. The phase tapers shape the antenna beams formed by the C-band linear arrays 140 so that they are electronically downtilted in the elevation plane. The phase shifters 164 may be adjustable phase shifters so that the amount of downtilt applied to the antenna beams can be adjusted in order to change the sizes of the coverage areas of the C-band antenna beams.

As noted above, the C-band linear arrays 140-1 through 140-4 may be configured to operate as a multi-column beamforming array 148 (see FIG. 3A). Accordingly, the C-band radio 190 may generate four RF signals from a baseband data stream that are passed through, for example, ports 192-1, 192-3, 192-5 and 192-7 of the C-band radio 190 to the corresponding RF ports 162-1, 162-3, 162-5, 162-7 of base station antenna 100, where they are fed to the −45° polarization radiators of the radiating elements 142 in each C-band linear array 140. The amplitudes and/or phases of the four RF signals output by the C-band radio 190 are configured so that the composite antenna beam formed by the multi-column beamforming array 148 (which is a superposition of the four individual antenna beams generated in response to the four RF signals) is narrowed in the azimuth plane, thereby providing a composite antenna beam having increased gain. The portion of the feed network 160 that feeds the +45° radiators of radiating elements 142 may operate in the same fashion to form a second composite antenna beam and hence description of the remainder of the C-band feed network 160 will be omitted.

As described above, the CBRS-band feed network 150 may be configured to apply a fairly large downtilt to the CBRS-band antenna beams. In some embodiments, the CBRS-band phase shifters 154 may be configured so that they can impart a wide range of electronic downtilts to the CBRS-band antenna beams. In other embodiments, the CBRS-band feed network 150 may be configured to impart a fixed amount of electronic downtilt (e.g., 8°) to the CBRS-band antenna beams by, for example, configuring the RF transmission lines extending between the outputs of each phase shifters 154 and the individual radiating elements 132 that are fed by the phase shifter 154 to have different lengths so that a phase taper that will apply the fixed amount of electronic downtilt will be applied by the RF transmission lines. The phase shifters 154 may then be used to further adjust the amount of downtilt applied about the fixed amount of downtilt to impart a desired amount of downtilt. For example, if the amount of fixed downtilt is −8° and each phase shifter 154 is configured so that it can impart +/−3° of electronic downtilt, the antenna beams formed by the CBRS-band linear arrays 130 may be configured to have anywhere between −5° and −11° of electronic downtilt. The CBRS-band antenna beams may be pointed in the elevation plane so that the portion of the antenna beam having a peak gain (i.e., the boresight pointing direction of the antenna beam) intersects the plane defined by the horizon (as seen from the base station antenna 100) along a curve that is relatively close to the base station antenna 100. This may ensure that the CBRS-band antenna beams can provide coverage to users within the close-in region 72 of the sector 70 served by base station antenna 100.

The C-band feed network 160 may be configured to apply a lesser amount of electronic downtilt to the C-band antenna beams. The C-band linear arrays 140 may have more radiating elements 142 than the CBRS-band linear arrays 130, and hence the elevation beamwidth of the C-band antenna beams may be smaller than the elevation beamwidth of the CBRS-band antenna beams. The C-band antenna beams may be configured to provide coverage to at least the far-out region 74 of the sector 70. The phase shifters 164 of the C-band feed network 160 may be used to adjust the amount of electronic downtilt imparted to the C-band antenna beams to a desired value in order to set a coverage area for the C-band linear arrays 140.

Figure 3D:
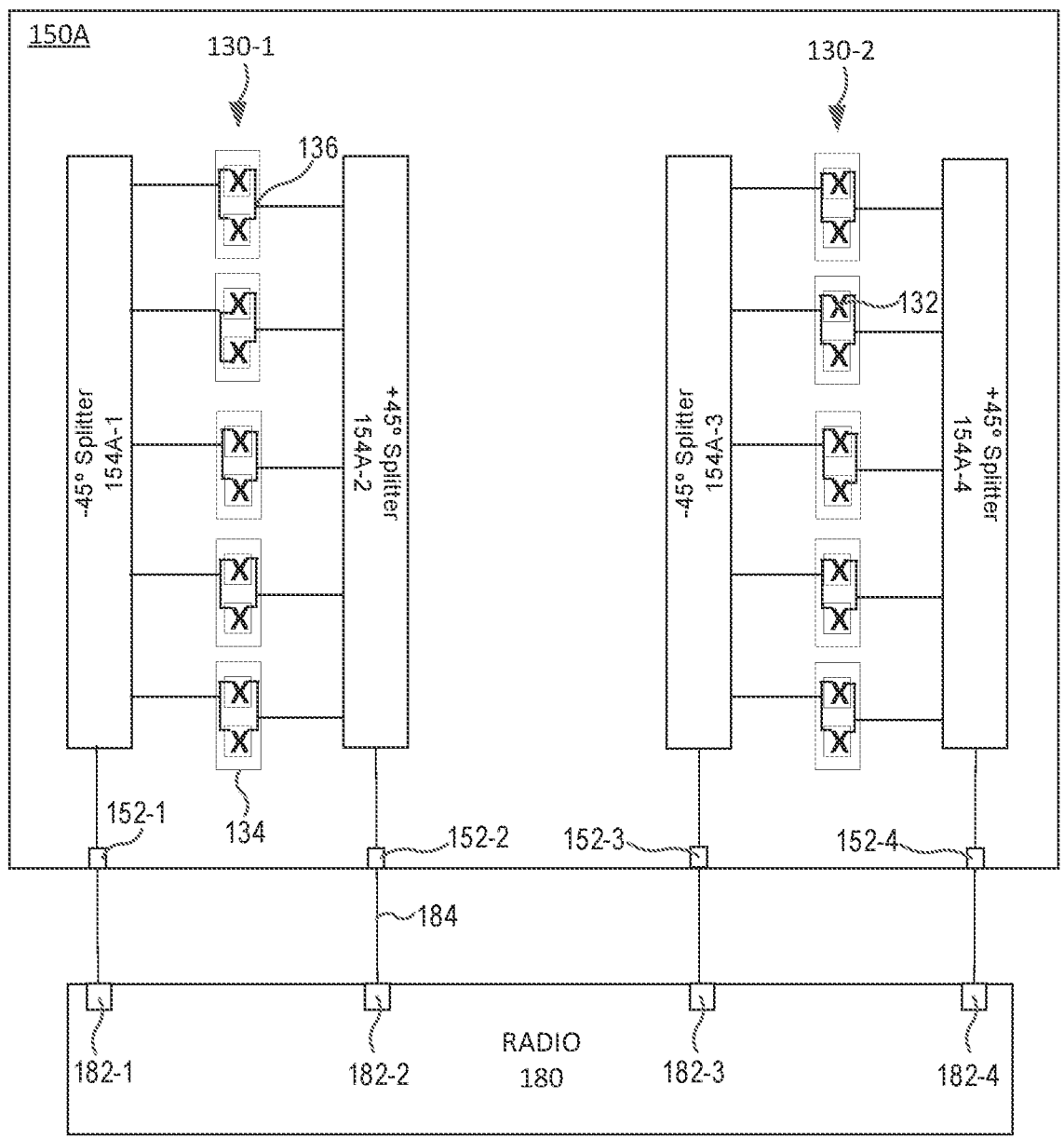
FIG. 3D is a block diagram of an alternate feed network for the CBRS-band array of the base station antenna of FIG. 3A.

FIG. 3D is a block diagram of an alternate feed network 150A for the CBRS-band linear arrays 130 of the base station antenna 100 of FIG. 3A. As shown in FIG. 3D, the feed network 150A is similar to the feed network 150 that is discussed above, except that the phase shifters 154 are omitted and replaced with a power divider network 154A. The feed network 150A thus will only apply a fixed amount of electronic downtilt that is provided by the phase taper that is built into the RF transmission lines extending between the outputs of each phase shifters 154 and the individual radiating elements 132, with the amount of fixed electronic downtilt determined at the time of manufacture. Since the CBRS-band antenna beams only cover the close-in region 72 of the sector 70, it is anticipated that the size of the sector 70 will never be reduced to be smaller than the size of the close-in region 72, and hence the extra cost of phase shifters 154 for the CBRS-band feed network 150A may be avoided.

One complication with the use of the CBRS frequency band for outdoor cellular applications is that any change in the size of the coverage area for a CBRS base station must be reported within a very short period of time to an entity known as a Spectrum Allocation Service that manages which entities are allowed to use the CBRS frequency band in different geographic locations. Cellular operators are concerned that front line employees may fail to always report such changes to the coverage area to the assigned Spectrum Allocation Service, which can lead to regulatory or legal issues. If CBRS service is implemented in a conventional manner, it will typically be necessary to occasionally adjust the size of the CBRS coverage area by changing the electronic downtilt applied to the CBRS antenna beams as changes are made in the cellular network (e.g., as new base stations are added). The feed network of FIG. 3D ensures that the CBRS coverage area will remain static, as it only covers the close-in portion 72 of the sector 70, and hence even if the size of the coverage area for the base station antenna 100 is changed, the size of the CBRS coverage area may remain static. This may avoid the aforementioned potential legal and/or regulatory issues.

FIG. 3E is a schematic front view of a base station antenna 200 according to further embodiments of the present invention that again includes separate CBRS-band and C-band linear arrays 130, 140. The base station antenna 200 is similar to the base station antenna 100 discussed above, except that the CBRS-band linear arrays 130 are positioned on either side of the C-band linear array 140 instead of being positioned above the C-band linear arrays 140. While the base station antenna 200 is wider than the base station antenna 100 in order to accommodate moving the CBRS-band linear arrays 130 to surround the C-band linear arrays 140, in applications where the low-band and mid-band linear arrays 110, 120 have relatively wide elevation angle requirements (and hence fewer radiating elements 112, 122), the design of FIG. 3E may be preferred as the length of the base station antenna 200 may be reduced so that the overall volume of the base station antenna 200 may be smaller.

Figure 4A:
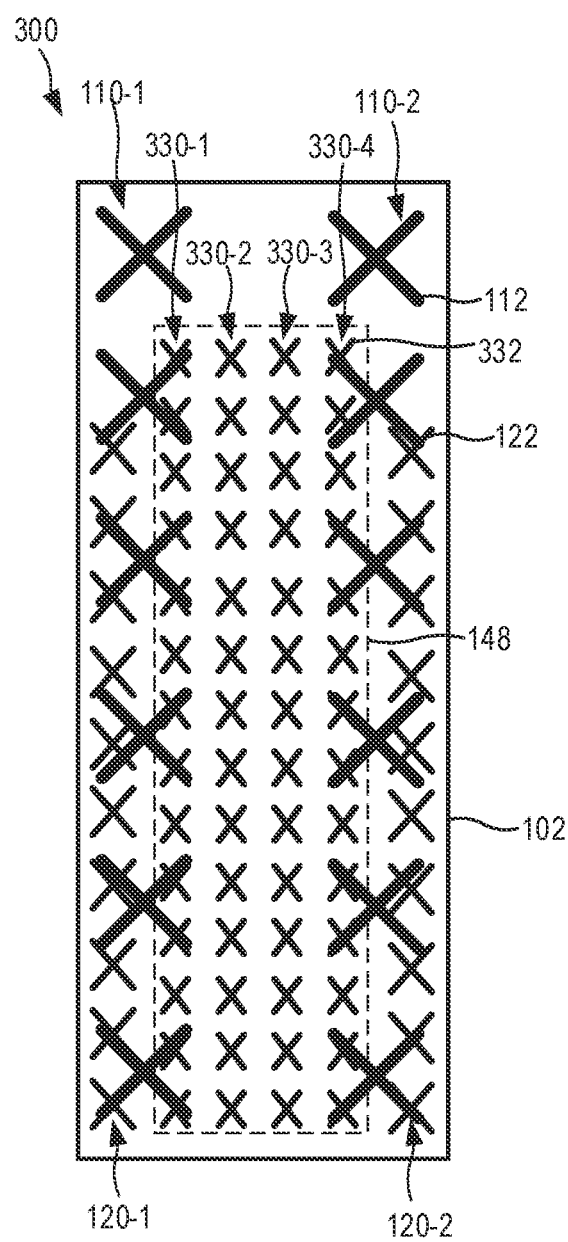
FIG. 4A is a schematic front view of a base station antenna (with the radome removed) according to embodiments of the present invention that includes a single, diplexed CBRS/C-band array.

FIG. 4A is a schematic front view of a base station antenna 300 according to embodiments of the present invention that includes a plurality of CBRS/C-band linear arrays 330-1 through 330-4 that are shared using diplexers (in contrast to the base station antennas 100, 200 discussed above that include separate CBRS-band and C-band linear arrays 130, 140). As shown in FIG. 4A, the base station antenna 300 includes the same low-band and mid-band linear arrays 110, 120 that are included in base station antennas 100, 200 (except that the low-band linear arrays 110 each have one fewer radiating element 112), and hence further description of linear arrays 110, 120 will be omitted. A total of four linear arrays 330-1 through 330-4 of CBRS/C-band radiating elements 332 are provided. Each radiating element 332 may be configured to operate across the full 3.55-3.98 GHz frequency band so that they may be used to transmit and receive both CBRS-band and C-band RF signals. Each sub-array of CBRS/C-band radiating elements 332 may be coupled to a diplexer 358, as will be discussed below with reference to FIG. 4B.

Figure 4B:
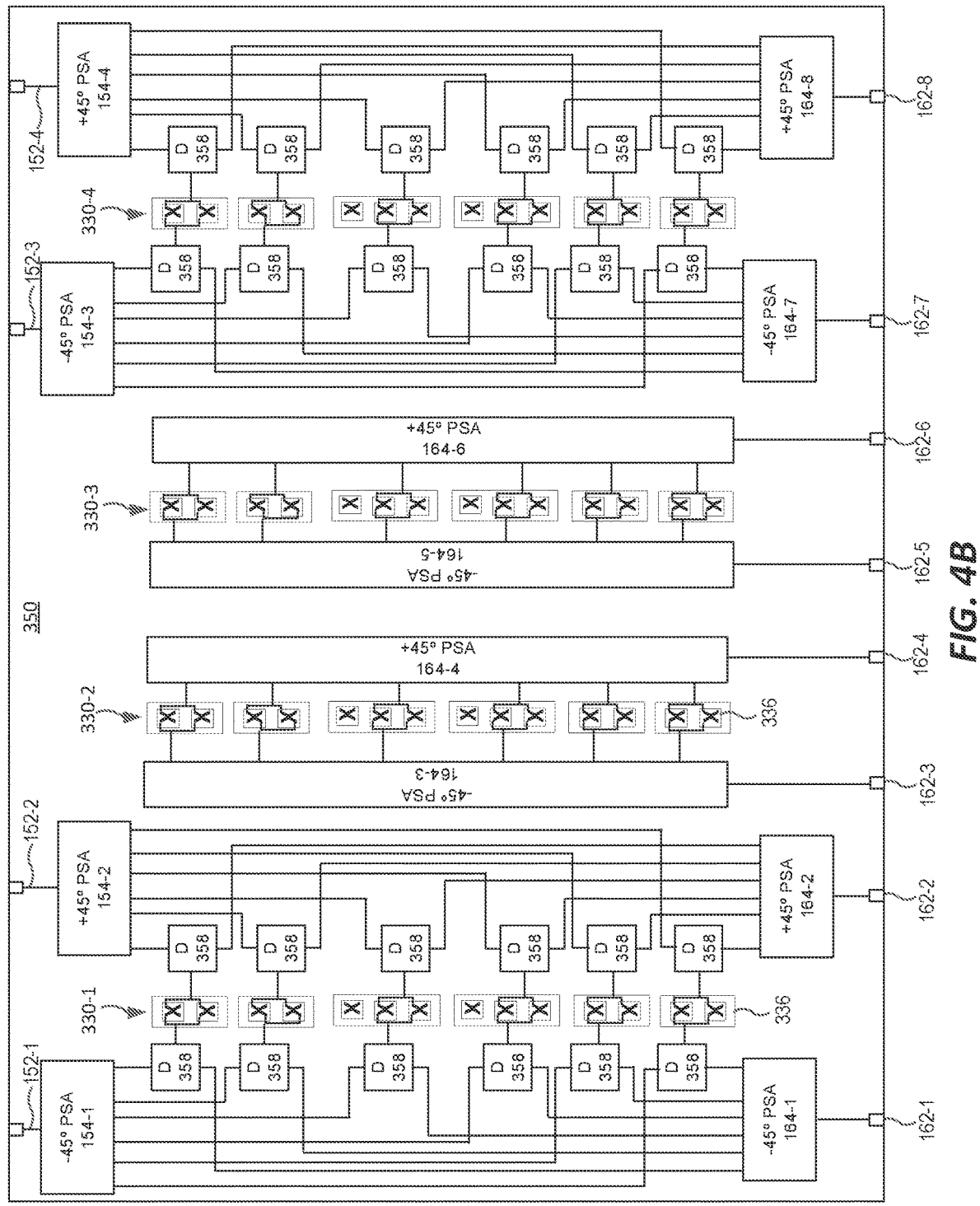
FIG. 4B is a block diagram of a feed network for the CBRS/C-band array of the base station antenna of FIG. 4A.

FIG. 4B is a block diagram of a feed network 350 for the CBRS/C-band linear arrays 330 of base station antenna 300 of FIG. 4A. As shown in FIG. 4B, the base station antenna 300 includes the four CBRS RF ports 152-1 through 152-4 and the eight C-band RF ports 162-1 through 162-8 that are discussed above with reference to FIGS. 3B and 3C. Four CBRS-band phase shifters 154-1 through 154-4 and eight C-band phase shifters (labelled "PSA" in FIG. 4B) 164-1 through 164-8 are provided, which may be identical to the like-numbered phase shifters of FIGS. 3B and 3C that are discussed above. As is further shown in FIG. 4B, feed network 350 further includes a plurality of diplexers (labelled "D" in FIG. 4B) 358. Diplexers are well known in the art, and refer to three-port devices that include a first frequency band port, a second frequency band port and a common port. The first and second frequency band ports only pass RF signals in respective first and seconds frequency bands, while the common port passes RF signals in both the first and second frequency bands. Diplexers that perform frequency dependent splitting and combining of RF signals in more than two frequency bands are also known in the art. For example, a triplexer is a four port device that has three frequency dependent ports and one common port and may be considered to be a diplexer that further splits out signals in a third frequency band.

Each diplexer 358 has a first frequency band port that is coupled to an output of one of the CBRS-band phase shifters 154 and a second frequency band port that is coupled to an output of one of the C-band phase shifters 164. The common port of each diplexer 358 is coupled to the respective feed boards 336 of the CBRS/C-band linear arrays 330. In the depicted embodiment, diplexers 358 are only provided for the outside linear arrays 330-1 and 330-4, as only these linear arrays are shared for both CBRS-band and C-band. Linear arrays 330-2 and 330-3 are only used for C-band communications. Each linear array 330-1 through 330-4 may be separated from adjacent ones of the linear arrays 330-1 through 330-4 by about one half a wavelength corresponding to the 3850 MHz center frequency of the C-band frequency band. Note that linear arrays 330-1 and 330-4 are separated by more than a wavelength corresponding to the 3625 MHz center frequency of the CBRS frequency band, and hence may be suitably decorrelated for supporting MIMO communications.

In the embodiment of FIG. 4B, only two of the four linear arrays 330 support CBRS communications. This may be an appropriate configuration when the four linear arrays 330-1 through 330-4 are operated at C-band as a multi-column beamforming array (using 2×MIMO transmission techniques) and when the linear arrays 330-1 through 330-4 are operated at CBRS to support 4×MIMO communications without beamforming (as only two linear arrays need to be used at CBRS-band, and they should be separated by at least one CBRS-band wavelength). In other embodiments, the linear arrays 330-1 through 330-4 may be configured to support beamforming at both CBRS-band and at C-band. In such embodiments, CBRS phase shifters 154 and diplexers 358 may also be provided for linear arrays 330-2 and 330-3.

The base station antenna 300 may operate in essentially the same manner as the base station antenna 100, except that linear arrays 330-1 and 330-4 are shared for both CBRS-band and C-band communications. The CBRS-band portion of feed network 350 may be configured to form CBRS-band antenna beams that provide coverage to users in the close-in region 72 of sector 70, while the C-band portion of the feed network 350 may be configured to form C-band antenna beams that provide coverage to users in the far-out region 74 of sector 70.

The base station antenna 300 shares the linear arrays 330-1 and 330-4 between both CBRS-band and C-band, thereby reducing the number of radiating elements 332 required (which lowers cost) and allowing the overall size of the base station antenna 300 to be reduced. However, base station antenna 300 requires a large number of diplexers 358 (a total of twenty-four diplexers 358 in the depicted example embodiment). Since the CBRS-band and C-band frequency ranges are directly adjacent each other, with no guard band, high performance diplexers are required, which tend to be large and expensive components. Thus, base station antennas 100 and 200 may be more practical solutions for applications where the elevation plane sector splitting is performed at CBRS-band and C-band. However, it will be appreciated that the base station antennas according to embodiments of the present invention may be used to perform elevation sector splitting for other frequency bands, and that if the two frequency bands are separated by a sufficiently large guard band, then low-cost diplexers (e.g., printed circuit board diplexers) may be used and the design of base station antenna 300 may be preferred over base station antennas 100 and 200.

As can be seen from FIG. 4B, the four linear arrays 330-1 through 330-4 comprise a multi-column array of radiating elements. This multi-column array is configured to operate as a static sector antenna in the CBRS-band and to operate as a beamforming antenna in the C-band. All four columns 330-1 through 330-4 in the multi-column array operate at C-band while less than all of the columns 330-1 through 330-4 operate at CBRS-band (namely only columns 330-1 and 330-4 operate at CBRS-band.

Pursuant to further embodiments of the present invention, twin beam base station antennas are provided that use beamforming networks to perform sector splitting in the elevation plane. Conventionally, sector splitting refers to a technique where a sector of a cell is sub-divided into two or more sub-sectors in the azimuth plane, and the base station antenna that serves the sector is configured to generate a separate antenna beam for each sub-sector that points to the centers of the respective sub-sectors. For example, a single "twin beam" antenna may be deployed at a conventional three-sector base station (see FIG. 1) in order to split one of the 120° sectors in the azimuth plane into two 60° subsectors in the azimuth plane that operate in the same frequency band. The base station antenna uses beamforming networks to generate a pair of antenna beams that each have a half-power azimuth beamwidth of about 33° (to appropriately provide coverage to a 60° sub-sector), and the antenna beams may be pointed at angles of about −30° and 30° (where the center of the sector 70 is at a boresight angle of 0°). Since the antenna beams have narrowed azimuth beamwidths, they also have increased gain, and hence can support higher throughputs.

Figure 5A:
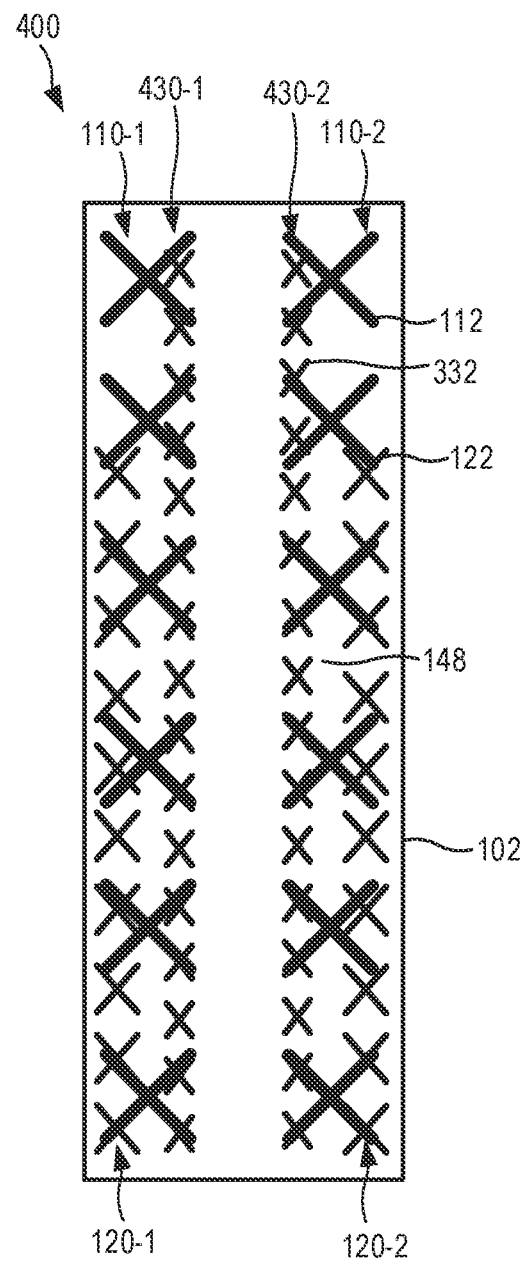
FIG. 5A is a schematic front view of a base station antenna (with the radome removed) according to embodiments of the present invention that implements CBRS/C-band sector splitting in the elevation plane.
Figure 5B:
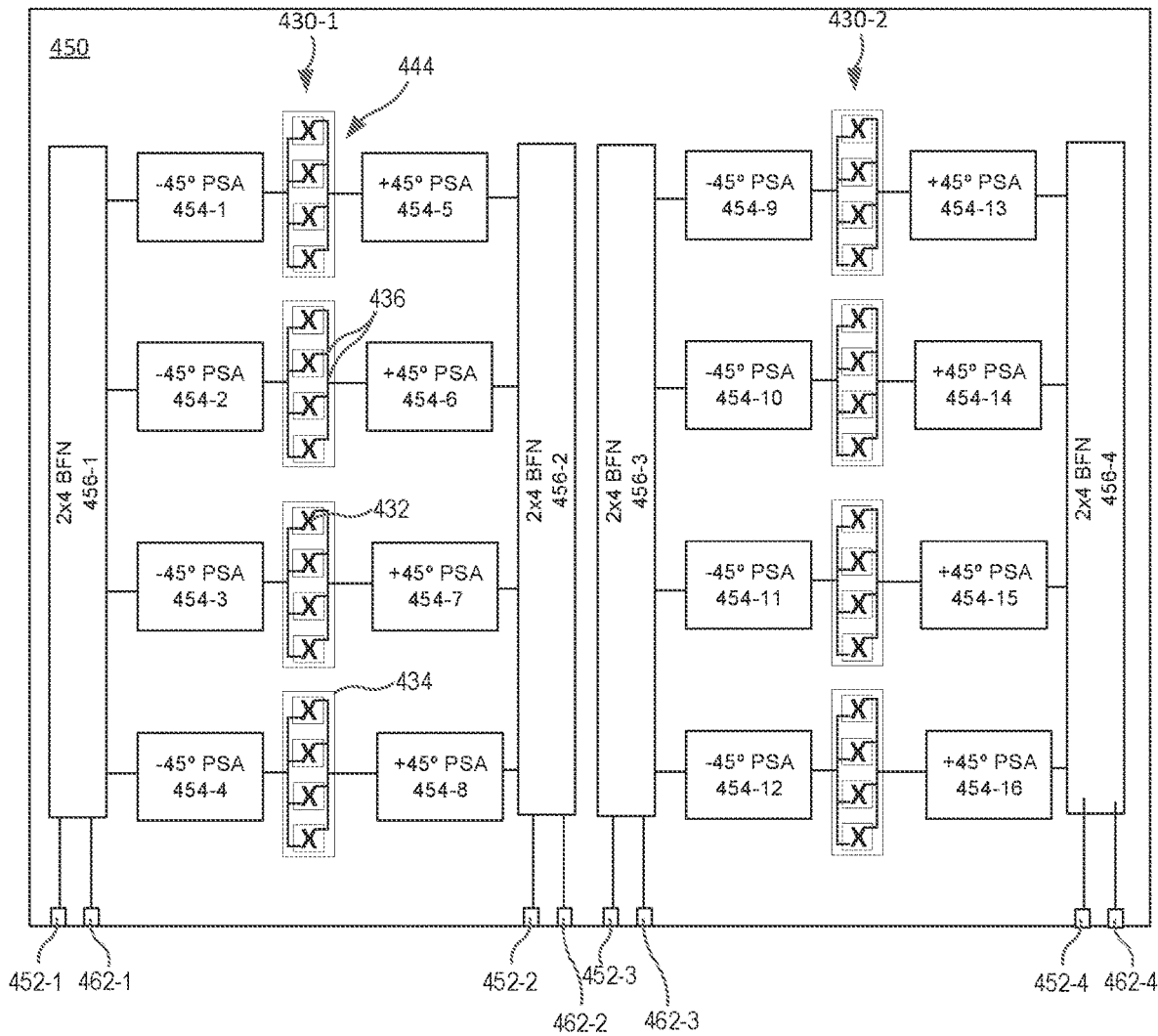
FIG. 5B is a schematic block diagram of the feed network for the CBRS/C-band array of the base station antenna of FIG. 5A.

The base station antennas according to some embodiments of the present invention use beamforming networks to perform such sector-splitting, but do so in the elevation plane instead of the azimuth plane. In particular, these base station antennas may form a first antenna beam that points at a first elevation angle and a second antenna beam that points at a second elevation angle that is different from the first elevation angle. In some embodiments, the first antenna beam may be formed in response to an RF signal from a CBRS radio, and the second antenna beam may be formed in response to an RF signal from a C-band radio. Thus, the sub-sectors are supported using different frequency bands. A single array of radiating elements may be used to generate both antenna beams. Diplexers are not required in this embodiment, as a beamforming network such as a Butler Matrix is used to provide isolation between the CBRS-band and C-band antenna beams. FIGS. 5A and 5B illustrate one example of such an elevation plane sector-splitting base station antenna 400 according to embodiments of the present invention.

FIG. 5A is a schematic front view of the sector splitting antenna 400 with the radome removed. FIG. 5B is a schematic block diagram of a feed network 450 for the CBRS-band/C-band linear arrays 430-1 and 430-2 of base station antenna 400.

As shown in FIG. 5A, the base station antenna 400 includes both the low-band and mid-band linear arrays 110, 120 that are included in base station antenna 100, discussed above. Further description of these linear arrays will be omitted for brevity. Additionally, the base station antenna 400 includes two linear arrays 430-1 and 430-2 of CBRS-band/C-band radiating elements 432. The CBRS/C-band radiating elements 432 may be identical to the CBRS/C- band radiating elements 332 that are discussed above, and hence further description thereof will be omitted.

The linear arrays 430 of CBRS/C-band radiating elements 432 may include a larger number of radiating elements 432 than are included in the previously discussed base station antennas 100, 200, 300 according to embodiments of the present invention. The larger number of radiating elements 432 may facilitate generating narrow antenna beams in the elevation plane that perform sector-splitting in the elevation plane. Referring to FIG. 5B, each linear array 430 includes a total of sixteen CBRS/C-band radiating elements 432 that are divided into four sub-arrays 444, where each sub-array 444 comprises four radiating elements 432 that are mounted on a common feed board 434. Power splitters 436 are provided on each feed board 434 that split RF signals passed to the feed board 434 (for RF signals passing in the transmit direction) into sub-components that are passed to each radiating element 432 on the feed board 434, and which combine RF signals received at the radiating elements 432 (for RF signals passing in the receive direction) into a composite RF signal.

As shown in FIG. 5B, the base station antenna 400 includes four CBRS RF ports 452-1 through 452-4 as well as four C-band RF ports 462-1 through 462-4. CBRS RF ports 452-1 and 452-2 may be used to feed the respective −45° and +45° radiators of the CBRS/C-band radiating elements 432 in linear array 430-1, and CBRS RF ports 452-3 and 452-4 may be used to feed the respective −45° and +45° radiators of the CBRS/C-band radiating elements 432 in linear array 430-2. Similarly, C-band ports 462-1 and 462-2 may be used to feed the respective −45° and +45° radiators of the CBRS/C-band radiating elements 432 in linear array 430-1, and C-band ports 462-3 and 462-4 may be used to feed the respective −45° and +45° radiators of the CBRS/C-band radiating elements 432 in linear array 430-2. In base station antenna 400, 4×MIMO service may be supported at both CBRS-band and C-band using the four antenna beams formed in each band. The linear arrays 430-1 and 430-2 may be separated by at least one wavelength corresponding to the center frequency of the CBRS frequency band to ensure sufficient decorrelation between the four antenna beams.

As is further shown in FIG. 5B, the feed network 450 for the linear arrays 430 of CBRS/C-band radiating elements 432 includes four beamforming networks 456-1 through 456-4. In the depicted embodiment, each beamforming network 456 comprises a 2×4 Butler Matrix that includes two inputs and four outputs, where the terms "input" and "output" are arbitrarily used for signals passing in the transmit direction. The feed network 450 further includes a plurality of adjustable phase shifters 454 in the form of individual phase shifters. The adjustable phase shifters 454 may be used to apply respective electronic downtilts to the antenna beams formed by the linear arrays 430 in order to adjust the size of the coverage area. As the adjustable phase shifters 454 are downstream of the beamforming networks 456, the adjustment in the electronic downtilt is applied to both the C-band antenna beams and the CBRS-band antenna beams. Thus, when an electronic downtilt is increased, the outer extent of both the close-in region 72 and the far-out region 74 of the sector 70 move closer to the base station antenna 400.

Each beamforming network 456 feeds a respective one of the linear arrays 430, with the four outputs of the beamforming network 456 coupled to the four sub-arrays 444 of radiating elements 432 in the respective linear array 430. Each beamforming network 456 is configured to receive the CBRS-band and C-band RF signals that are input at RF ports 452, 462, and will form respective CBRS-band and C-band antenna beams in response to the RF signals.

The beamforming network 456 combines the CBRS-band and C-band RF signals that are input thereto and feeds the combined signals to the four sub-arrays 444 of CBRS/C-band radiating elements 432. This combination is done in such a way that a CBRS-band antenna beam is generated that is electronically scanned in a first direction in the elevation plane from the boresight pointing direction of the base station antenna 400 and so that a C-band antenna beam is generated that is scanned in a second (opposite) direction in the elevation plane from the boresight pointing direction of the base station antenna 400. The feed network 450 may further include a fixed electronic downtilt which may be implemented, for example, by varying the lengths of the transmission lines that extend between the outputs of each beamforming network 456 and its associated sub-arrays 444, in order to set the boresight pointing direction of each linear array 430 below 0°. For example, the fixed electronic downtilt may be 5° (assuming, the boresight pointing direction of the base station antenna 400 is 0° in the elevation plane, the fixed electronic downtilt of 5° resets the boresight pointing direction to −5°, and the CBRS-band and C-band antenna beams may point at elevation angles on either side of the −5° boresight pointing direction (e.g., at −8° and −2°, respectively). In this manner, the sector 70 may be "split" in the elevation plane so that the CBRS-band antenna beams provides coverage to users in the close-in region 72 and the C-band antenna beams provide coverage to users in the far-out region 74.

The beamforming network can typically only generate certain amounts of phase shift. For example, a four-beam Butler Matrix style beamforming network may be designed to have phase progressions of −135°, −45°, +45°, and +135°. A two-beam Butler Matrix is usually configured to generate phase progressions of −45° and +45°. The pointing directions of the CBRS-band and C-band antenna beams are controlled by the distance between the phase centers of the sub-arrays. Specifically, for a phase progression of X (e.g., +45°), the elevation angle of the peak of the antenna beam is $\theta = D * \sin(X)$, where D is the distance between the phase centers in degrees (a value of D=1 wavelength corresponds to 360°). Thus, the elevation angles of the peaks of the CBRS-band and C-band antenna beams depend on both the spacing between radiating elements 432 and the number of radiating elements in each subarray 444. The pointing directions of the CBRS-band and C-band antenna beams may also be adjusted using adjustable phase shifters 454 as shown in FIG. 5B. The elevation beamwidths of the CBRS-band and C-band antenna beams may be adjusted by increasing or decreasing the number of radiating elements 432 in the linear arrays 430 (and hence the aperture of the linear arrays 430 in the elevation plane).

Figure 5C:
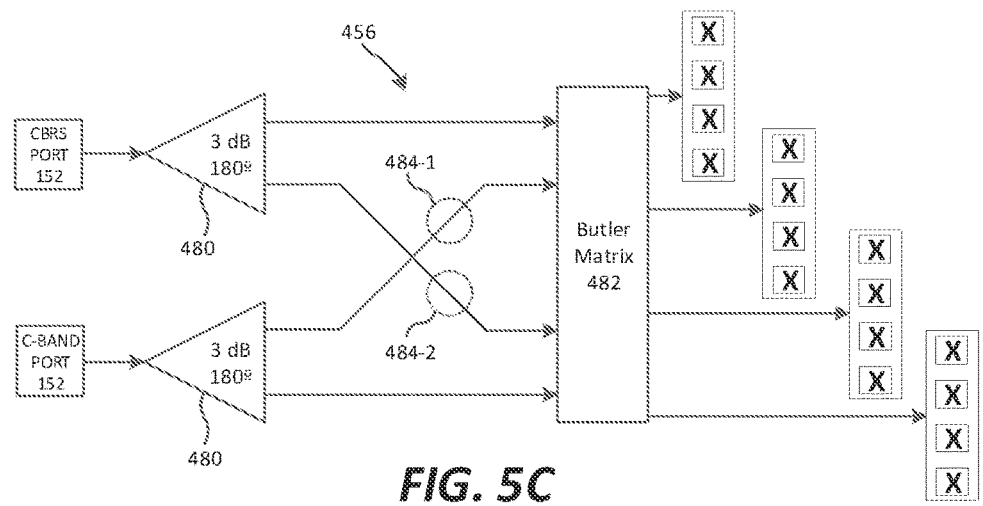
FIG. 5C is a block diagram of an example 2×4 beam-forming network that can be used to implement the beam-forming networks in the feed network of FIG. 5B.

FIG. 5C is a high-level circuit diagram of one possible implementation of the beamforming networks 456 that are included in the base station antenna 400 of FIGS. 5A-5B. As shown in FIG. 5C, each beamforming network 456 may be implemented as a bidirectional 2×4 beam-forming network. The first input of each beamforming network 456 is coupled to a CBRS-band RF port 152 and the second input of each beamforming network 456 is coupled to a C-band RF port 162. The two inputs of beamforming network 456 are coupled to respective first and second 180° equal power dividers 480. Each 180° equal power dividers 480 may be implemented, for example, using a Wilkinson power divider with a 180° Shiffman phase shifter. However, other power dividers can alternatively be used, such as rat-race 180° couplers or 90° hybrids with additional phase shift. The outputs of each 180° equal power divider 480 are coupled to a 4×4 Butler Matrix 482. Each output of the Butler Matrix 482 is coupled to a respective one of the sub-arrays 434. As is shown by the dotted circles 484-1, 484-2, in some embodiments additional phase shifters may be provided between the 180° equal power dividers 480 and the Butler Matrix 482. As another example, the 4×4 Butler Matrix 482 may be replaced with a 2×4 Butler Matrix and the 180° equal power dividers 480 and additional phase shifters 484 shown in FIG. 5C may be omitted.

Figure 6:
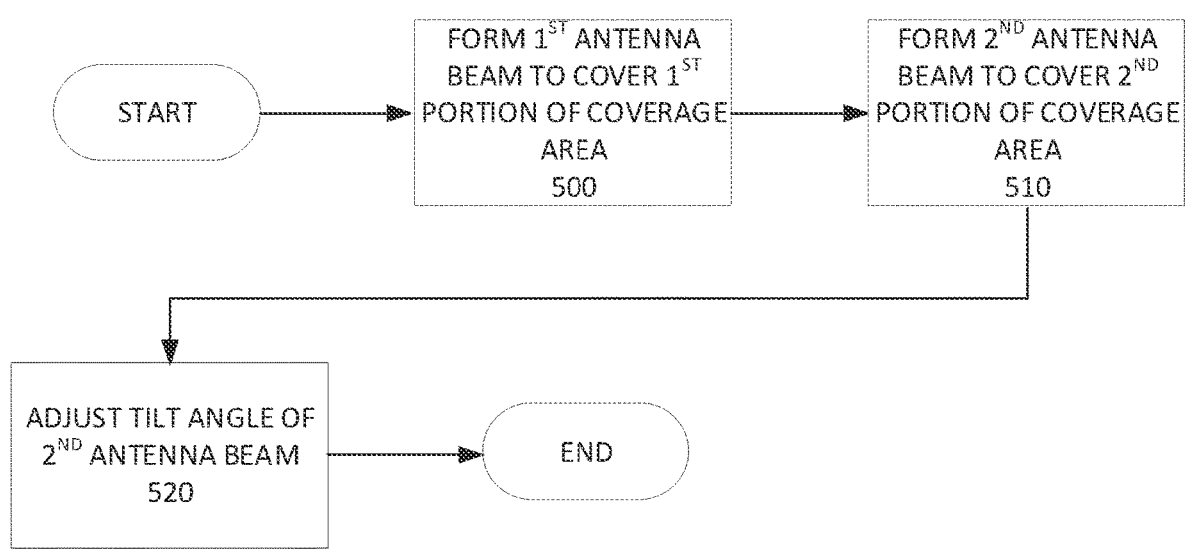
FIG. 6 is a flow chart of a method of operating a base station antenna according to embodiments of the present invention.

FIG. 6 is a flow chart of a method of operating a base station antenna according to embodiments of the present invention. As shown in FIG. 6, operations may begin with using the base station antenna to form a first antenna beam in response to a first RF signal that provides coverage only to users within a first portion of a coverage area of the base station antenna that is close to the base station antenna (Block 500). The first antenna beam may comprise a CBRS-band antenna beam in some embodiments. The base station antenna is also used to form a second antenna beam in response to a second RF signal that provides coverage to users within a second portion of the coverage area that extends outwardly beyond the first portion (Block 510). The second antenna beam may comprise a C-band antenna beam in some embodiments. The second antenna beam may provide coverage to users in less than all of the coverage area. The half power beamwidth of the second antenna beam in an elevation plane of the base station antenna may be less than a half power beamwidth of the first antenna beam in the elevation plane. An electronic downtilt of the second antenna beam may be adjusted without electronically adjusting an electronic downtilt of the first antenna beam in some embodiments (Block 520).

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

Features and elements of any of the above-described embodiments may be incorporated into other embodiments to provide additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station antenna that is configured to provide service within a coverage area, comprising:
   a first radio frequency ("RF") port;
   a second RF port;
   a reflector assembly;
   a first antenna array that extends forwardly from the reflector assembly and that is configured to form a first antenna beam that has a first downtilt angle in response to a first RF signal that is input at the first RF port; and
   a second antenna array that extends forwardly from the reflector assembly and that is configured to form a second antenna beam that has a second downtilt angle in response to a second RF signal that is input at the second RF port,
   wherein the first antenna beam is configured to only provide coverage to first users within a first portion of the coverage area and the second antenna beam is configured to provide coverage to second users within a second portion of the coverage area that extends farther from the base station antenna than does the first portion.

2. The base station antenna of claim 1, wherein the first array is configured to operate in a first frequency band and the second array is configured to operate in a second frequency band.

3. The base station antenna of claim 2, wherein the first frequency band is a 3.55-3.70 GHz Citizen Broadband Radio Service ("CBRS") frequency band and the second frequency band is a 3.70-3.98 GHz C-band frequency band.

4. The base station antenna of claim 3, wherein a half power beamwidth of the second antenna beam in an elevation plane of the base station antenna is less than a half power beamwidth of the first antenna beam in the elevation plane.

5. The base station antenna of claim 1, wherein the first RF port is a first Citizen Broadband Radio Service ("CBRS")-band port, the second RF port is a first C-band RF port, the first array is a first CBRS-band array, the second array is a first C-band array, the first antenna beam is a first CBRS antenna beam, the second antenna beam is a first C-band antenna beam, and the radiating elements of the first array and the second array are each dual-polarized radiating elements, the base station antenna further comprising:
   a second CBRS-band RF port; and
   a second C-band RF port;
   wherein first radiators of the dual-polarized radiating elements of the first CBRS-band array are configured to generate the first CBRS-band antenna beam and second radiators of the dual-polarized radiating elements of the first CBRS-band array are configured to generate a second CBRS-band antenna beam that is sized to only provide coverage to the first portion of the coverage area that is close to the base station antenna, and
   wherein first radiators of the dual-polarized radiating elements of the first C-band array are configured to generate the first C-band antenna beam and second radiators of the dual-polarized radiating elements of the first C-band array are configured to generate a second C-band antenna beam that is sized to provide coverage to the second portion of the coverage area.

6. The base station antenna of claim 5, further comprising third and fourth Citizen Broadband Radio Service ("CBRS")-band RF ports;
third through eighth C-band RF ports;
a second CBRS-band array of the dual-polarized radiating elements that is configured to form third and fourth CBRS antenna beams; and
second through fourth C-band arrays of the dual-polarized radiating elements, wherein the second C-band array is configured as to form third and fourth C-band antenna beams, the third C-band array is configured as to form fifth and sixth C-band antenna beams, and the fourth C-band array is configured as to form seventh and eighth C-band antenna beams.

7. The base station antenna of claim 6, wherein the first through fourth C-band arrays are configured to operate as beamforming arrays in a manner that the first, third, fifth and seventh C-band antenna beams constructively combine to form a first composite C-band antenna beam that has a narrowed azimuth beamwidth as compared to the first C-band antenna beam, and the second, fourth, sixth and eighth C-band antenna beams constructively combine to form a second composite C-band antenna beam that has a narrowed azimuth beamwidth as compared to the second C-band antenna beam.

8. The base station antenna of claim 6, wherein the first and second CBRS arrays comprise respective first and second columns of radiating elements that are spaced apart by at least 0.9 of a first wavelength, where the first wavelength is the wavelength corresponding to a center frequency of an operating frequency band of the first and second CBRS arrays, and the first through fourth C-band arrays comprise respective first through fourth columns of radiating elements that are spaced apart by less than 0.6 of a second wavelength, where the second wavelength is the wavelength corresponding to a center frequency of an operating frequency band of the first through fourth C-band arrays.

9. The base station antenna of claim 1, wherein the coverage area comprises a 120° sector in an azimuth plane.

10. The base station antenna of claim 1, where the second downtilt angle is less than the first downtilt angle.

11. The base station antenna of claim 1, where the first RF port is coupled to first radio and the second RF port is coupled to a second radio, where the second radio has a higher output power level than the first radio.

12. The base station antenna of claim 1, wherein the first antenna beam provides coverage to less than half of the coverage area.

13. The base station antenna of claim 1, wherein the second array of radiating elements provides coverage to less than all of the coverage area.

14. The base station antenna of claim 1, wherein a feed network for the first array does not include any adjustable phase shifters and a feed network for the second array includes a plurality of adjustable phase shifters.

15. A base station antenna that is configured to provide service within a coverage area, comprising:
a first radio frequency ("RF") port;
a second RF port;
a first antenna array that is configured to form a first antenna beam that has a first downtilt angle in response to a first RF signal that is input at the first RF port; and
a second antenna array that is configured to form a second antenna beam that has a second downtilt angle in response to a second RF signal that is input at the second RF port,
wherein the first antenna beam is configured to only provide coverage to first users within a first portion of the coverage area and the second antenna beam is configured to provide coverage to second users within a second portion of the coverage area that extends farther from the base station antenna than does the first portion, and
wherein the first portion of the coverage area comprises a pie-shaped region having a point that extends outwardly from the base station antenna, and the second portion of the coverage area comprises a section of an annular region surrounding the base station that extends outwardly from the first portion of the coverage area.

16. The base station antenna of claim 15, wherein an outer portion of the first portion of the coverage area overlaps an inner portion of the second portion of the coverage area.

17. A base station antenna that is configured to provide service to a coverage area, comprising:
a first array of radiating elements that is configured to operate in all or part of a 3.55-3.70 GHz Citizen Broadband Radio Service ("CBRS") frequency band and that is configured to generate first antenna beams that provide coverage to only a first portion of the coverage area that is less than all of the coverage area; and
a second array of radiating elements that is configured to operate in all or part of a 3.70-3.98 GHz C-band frequency band and that is configured to generate second antenna beams that provide coverage to a second portion of the coverage area, where the second portion of the coverage area extends farther from the base station antenna than does the first portion,
wherein the second antenna array is configured to provide coverage to less than all of the coverage area.

18. The base station antenna of claim 17, wherein the first portion of the coverage area comprises less than half of the coverage area.

19. The base station antenna of claim 17, wherein the first portion of the coverage area comprises a pie-shaped region having a point that extends outwardly from the base station antenna, and the second portion of the coverage area comprises a section of an annular region surrounding the base station that extends outwardly from the first portion of the coverage area.

20. The base station antenna of claim 17, wherein half power beamwidths of the second antenna beams in an elevation plane of the base station antenna are less than half power beamwidths of the first antenna beams in the elevation plane.

* * * * *

UNITED STATES PATENT AND TRADEMARK OFFICE
CERTIFICATE OF CORRECTION

PATENT NO. : 11,418,975 B2
APPLICATION NO. : 17/149816
DATED : August 16, 2022
INVENTOR(S) : Firouzbakht et al.

It is certified that error appears in the above-identified patent and that said Letters Patent is hereby corrected as shown below:

On the Title Page

(54) Title: Please correct "PLAN" to read --PLANE--

In the Specification

Column 1, Line 2: Please correct "PLAN" to read --PLANE--

In the Claims

Column 24, Lines 29-30, Claim 2: Please correct "first array" to read --first antenna array--

Column 24, Line 31, Claim 2: Please correct "second array" to read --second antenna array--

Column 24, Lines 45-46, Claim 5: Please correct "the first array is a first CBRS-band array, the second array is a first C-band array," to read --the first antenna array is a first CBRS-band antenna array, the second antenna array is a first C-band antenna array,--

Column 24, Lines 48-49, Claim 5: Please correct "and the radiating elements of the first array and the second array are each dual-polarized" to read --and the first antenna array and the second antenna array each comprise dual-polarized--

Column 24, Line 54, Claim 5: Please correct "CBRS-band array" to read --CBRS-band antenna array--

Column 24, Line 57, Claim 5: Please correct "CBRS-band array" to read --CBRS-band antenna array--

Column 24, Line 62, Claim 5: Please correct "C-band array" to read --C-band antenna array--

Signed and Sealed this
Third Day of January, 2023

Katherine Kelly Vidal
*Director of the United States Patent and Trademark Office*

CERTIFICATE OF CORRECTION (continued)
U.S. Pat. No. 11,418,975 B2

Column 24, Line 65, Claim 5: Please correct "C-band array" to read --C-band antenna array--

Column 25, Line 5, Claim 6: Please correct "CBRS-band array" to read --CBRS-band antenna array--

Column 25, Line 8, Claim 6: Please correct "C-band arrays" to read --C-band antenna arrays--

Column 25, Line 9, Claim 6: Please correct "C-band array" to read --C-band antenna array--

Column 25, Line 11, Claim 6: Please correct "C-band array" to read --C-band antenna array--

Column 25, Line 13, Claim 6: Please correct "C-band array" to read --C-band antenna array--

Column 25, Line 16, Claim 7: Please correct "C-band arrays" to read --C-band antenna arrays--

Column 25, Line 17, Claim 7: Please correct "beamforming arrays" to read --beamforming antenna arrays--

Column 25, Line 27, Claim 8: Please correct "CBRS arrays" to read --CBRS antenna arrays--

Column 25, Lines 31-32, Claim 8: Please correct "CBRS arrays" to read --CBRS antenna arrays--

Column 25, Line 32, Claim 8: Please correct "C-band arrays" to read --C-band antenna arrays--

Column 25, Line 37, Claim 8: Please correct "C-band arrays" to read --C-band antenna arrays--

Column 25, Line 50, Claim 13: Please correct "second array of radiating elements provides" to read --second antenna array provides--

Column 25, Line 53, Claim 14: Please correct "first array" to read --first antenna array--

Column 25, Line 54, Claim 14: Please correct "second array" to read --second antenna array--

Column 26, Line 27, Claim 17: Please correct "first array of radiating elements that" to read --first antenna array that--

Column 26, Line 34, Claim 17: Please correct "second array of radiating elements that" to read --second antenna array that--